United States Patent
Saito et al.

(10) Patent No.: US 7,409,471 B2
(45) Date of Patent: Aug. 5, 2008

(54) DATA TRANSFER CONTROL DEVICE FOR DATA TRANSFER OVER A BUS, ELECTRONIC EQUIPMENT AND METHOD FOR DATA TRANSFER OVER A BUS

(75) Inventors: Nobuyuki Saito, Sapporo (JP); Shun Oshita, Sapporo (JP); Yoshiyuki Kamihara, Sapporo (JP); Kuniaki Matsuda, Sapporo (JP)

(73) Assignee: Seiko Epson Corporation, Tokyo (JP)

( * ) Notice: Subject to any disclaimer, the term of this patent is extended or adjusted under 35 U.S.C. 154(b) by 472 days.

(21) Appl. No.: 10/377,673

(22) Filed: Mar. 4, 2003

(65) Prior Publication Data
US 2003/0236932 A1    Dec. 25, 2003

(30) Foreign Application Priority Data
Apr. 26, 2002 (JP) ............... 2002-126880

(51) Int. Cl.
G06F 13/00 (2006.01)
G06F 13/28 (2006.01)
G06F 3/00 (2006.01)

(52) U.S. Cl. ............... 710/35; 710/5; 710/6; 710/33; 710/58

(58) Field of Classification Search ............. 710/5, 710/6, 30, 31, 32, 33, 50 F, 58
See application file for complete search history.

(56) References Cited

U.S. PATENT DOCUMENTS 6,801,959 B1 * 10/2004 Crutchfield et al. ........... 710/30

OTHER PUBLICATIONS

Cypress, SL811HS Embedded USB Host/Slave Controller, Mar. 14, 2002, Cypress Semiconductor Corporation, Rev. A.*
U.S. Appl. No. 10/369,630, filed Feb. 21, 2003, Saito et al.
U.S. Appl. No. 10/377,764, filed Mar. 4, 2003, Saito et al.
U.S. Appl. No. 10/377,765, filed Mar. 4, 2003, Saito et al.
U.S. Appl. No. 10/377,763, filed Mar. 4, 2003, Saito et al.
U.S. Appl. No. 10/377,632, filed Mar. 4, 2003, Saito et al.
Nobuyuki Saito; OTG Controller LSI Taking Reduction of CPU Load Into Consideration; Design Wave Magazine; Apr. 2002; pp. 82-88 and pp. 166; w/translation.

* cited by examiner

Primary Examiner—Kim Huynh
Assistant Examiner—Joshua D. Schneider
(74) Attorney, Agent, or Firm—Oliff & Berridge, PLC

(57) ABSTRACT

When a first mode (with-SOF mode) has been set, data transfer is performed while SOF packets are transferred at frame periods, and when a second mode (non-SOF mode) has been set and also non-periodic (bulk) transfer is being performed, the periodic transfer of SOF packets is disabled and non-periodic data is transferred. If there is no non-periodic data to be transferred, a SOF packet is transferred in the frame period, even if the second mode has been set. During host operation with USB on-the-go (OTG), pipe regions are allocated to the packet buffer, and non-periodic data is transferred automatically to or from end points while the periodic transfer of SOF packets is disabled. When all of the automatic transfer instruction signals of the pipe regions are inactive, SOF packets are transferred periodically even if the second mode has been set.

17 Claims, 21 Drawing Sheets

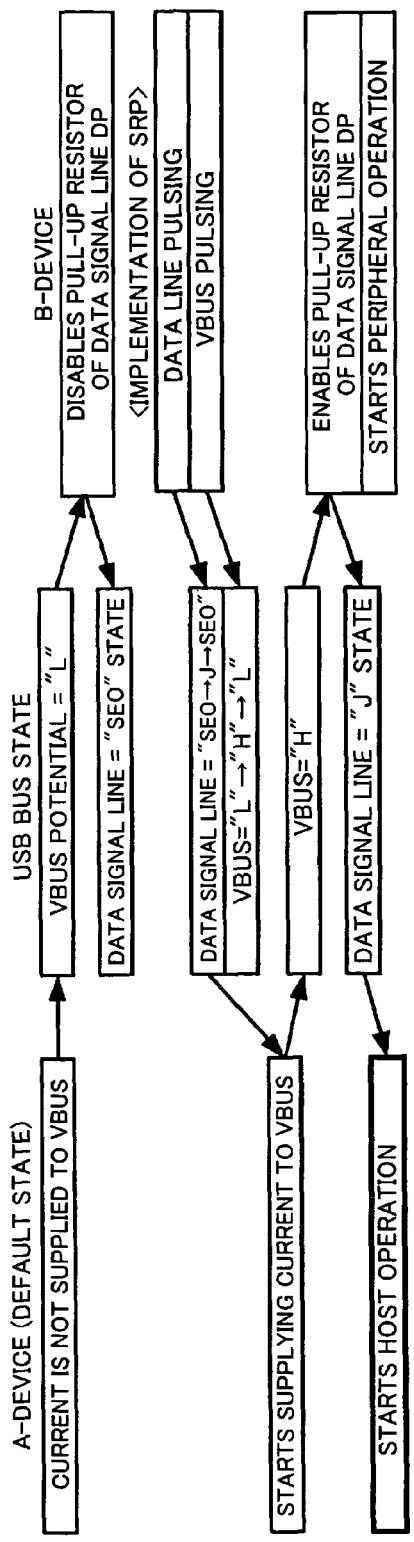
FIG. 2A   SRP (SESSION REQUEST PROTOCOL)
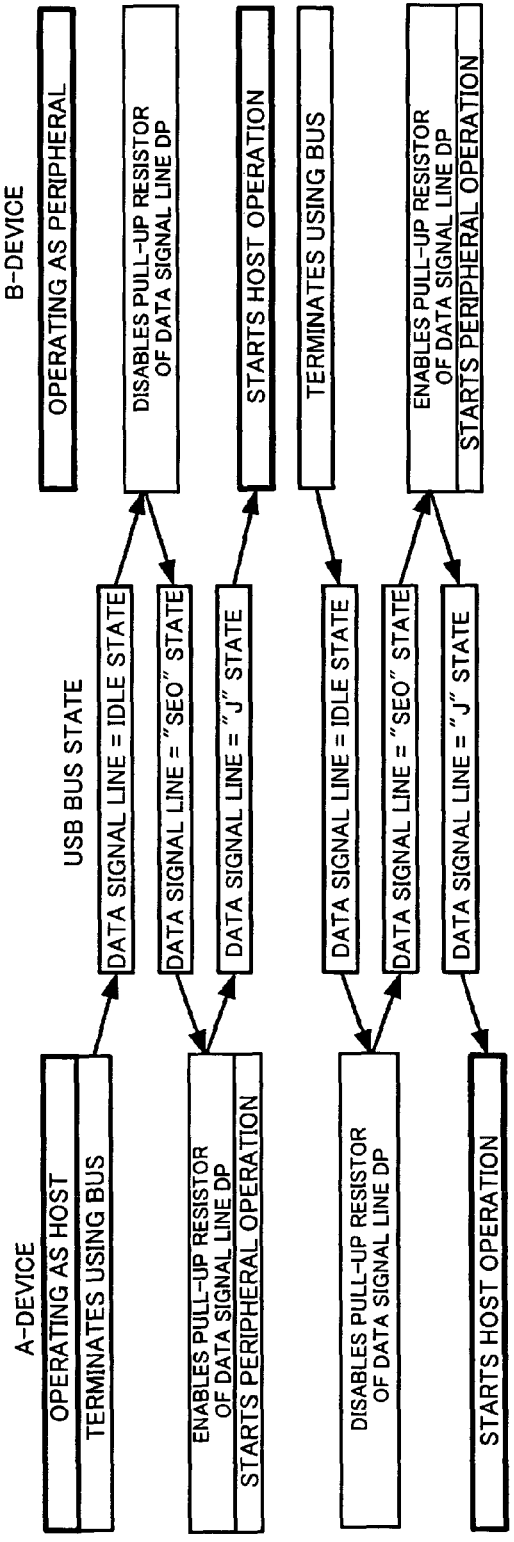
FIG. 2B   HNP (HOST NEGOTIATION PROTOCOL)

LIST STRUCTURE TYPE DESCRIPTOR

HOST (SUCH AS PERSONAL COMPUTER)

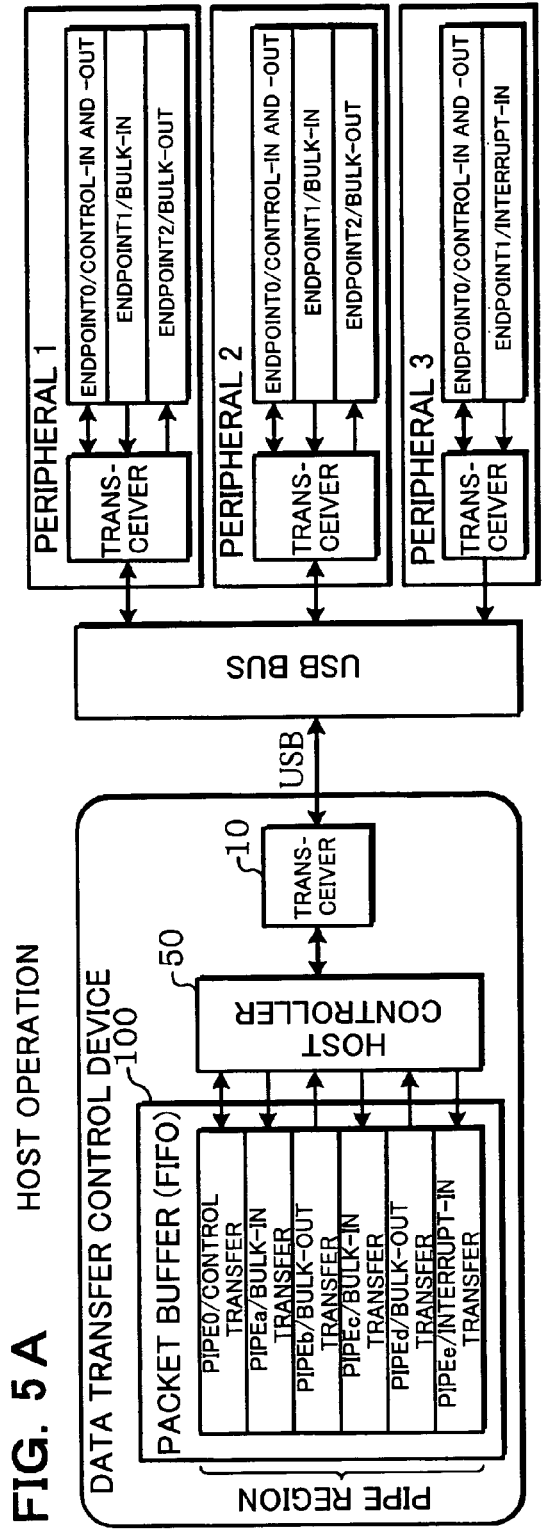
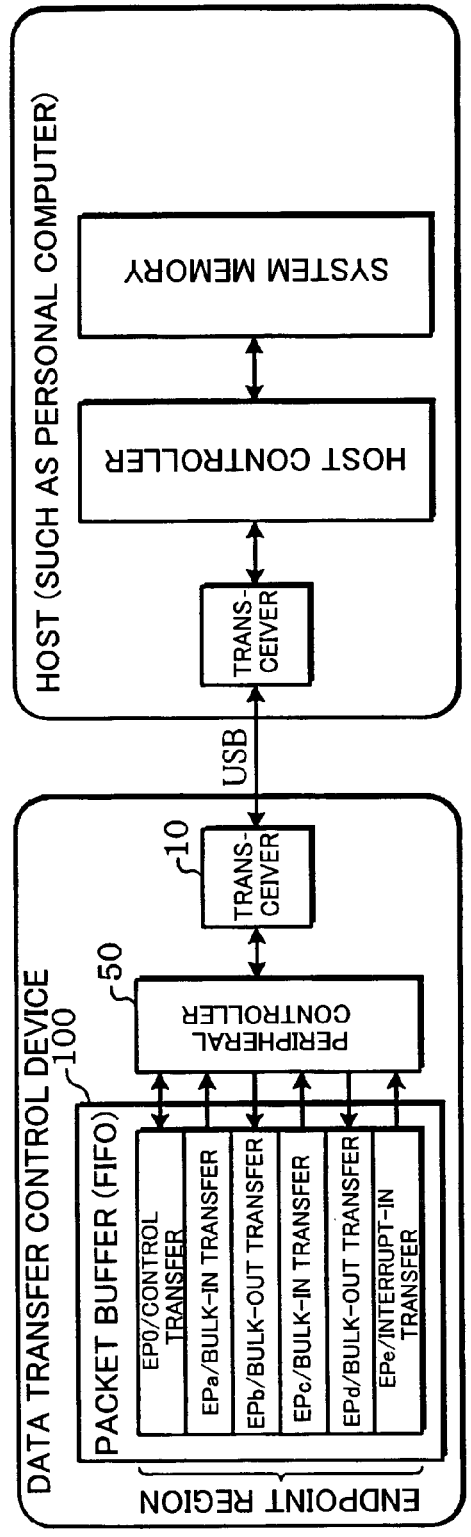
FIG. 5A  HOST OPERATION
FIG. 5B  PERIPHERAL OPERATION

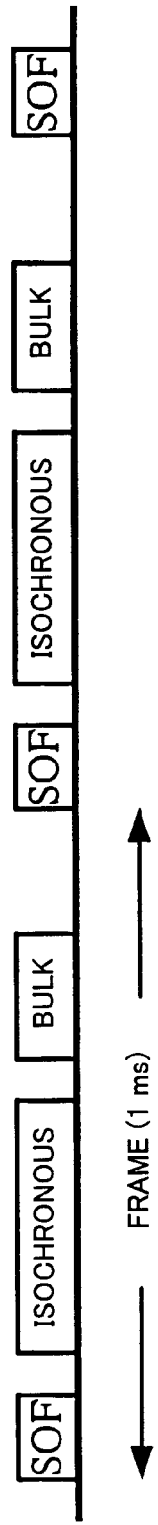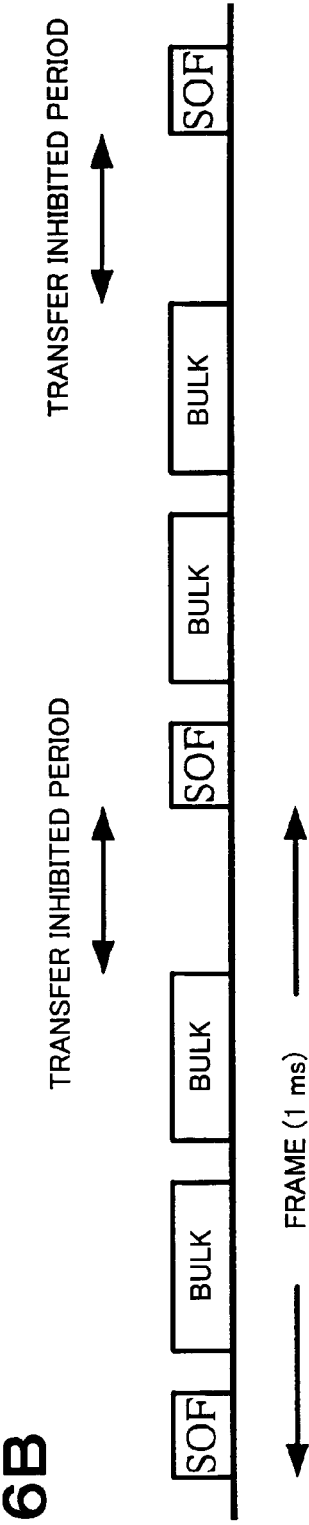
FIG. 6A
FIG. 6B

FIG. 11A

| HCState[1] | HCState[0] | STATE |
|---|---|---|
| 0 | 0 | SUSPEND |
| 0 | 1 | RESET |
| 1 | 0 | RESUME |
| 1 | 1 | HOST OPERATION |

FIG. 11B

| | INPUT SIGNALS | SOFCancel (0: ACTIVE) |
|---|---|---|
| F1 | HCState[1], [0] = 00, 01, OR 10 | 0 (SOF DISABLED) |
| F2 | HCState[1], [0]=11<br>EnNoSOFMode=0 | 1 |
| F3 | HCState[1], [0]=11<br>EnNoSOFMode=1<br>ANY ONE OF Pipe0TranGo TO PipeeTranGo IS 1 | 0 (SOF DISABLED) |
| F4 | HCState[1], [0]=11<br>EnNoSOFMode=1<br>ALL OF Pipe0TranGo TO PipeeTranGo ARE 0 | 1 |

HOST OPERATION

PERIPHERAL OPERATION

FIG. 14

REGISTER SECTION

| | | | |
|---|---|---|---|
| TRANSFER CONDITION REGISTERS (PIPE/EP CONTROL REGISTERS) (0, a TO e) | HC/PC (PIPE/EP) COMMON REGISTERS | REGISTERS USED BOTH DURING HOST OPERATION (PIPE) AND PERIPHERAL OPERATION (EP) | DATA TRANSFER DIRECTION, TRANSFER TYPE, END POINT NUMBER, MAXIMUM PACKET SIZE, NUMBER OF PAGES, PRESENCE/ABSENCE OF DMA CONNECTION, ETC. |
| | HC (PIPE) REGISTERS | REGISTERS USED ONLY DURING HOST OPERATION (PIPE) | INTERRUPT TRANSFER TOKEN ISSUE PERIOD, NUMBER OF TRANSACTION CONTINUOUS EXECUTIONS, FUNCTION ADDRESS, TOTAL SIZE OF TRANSFER DATA, AUTOMATIC TRANSACTION START INSTRUCTION, AUTOMATIC CONTROL TRANSFER MODE INSTRUCTION, ETC. |
| | PC (EP) REGISTERS | REGISTERS USED ONLY DURING PERIPHERAL OPERATION (EP) | END POINT ENABLE, HANDSHAKE SPECIFICATION, ETC. |
| | COMMON ACCESS CONTROL REGISTERS FOR PACKET BUFFER (FIFO) | REGISTERS ENABLING ACCESS CONTROL FOR PACKET BUFFER (FIFO) | BUFFER I/O PORT, BUFFER FULL/EMPTY, BUFFER REMAINING DATA SIZE, ETC. |
| INTERRUPT-RELATED REGISTERS | INTERRUPT STATUS REGISTER | REGISTER THAT INDICATES INTERRUPT STATUS (CAUSE) | OTGC-RELATED, HC (PIPE)-RELATED, PC (EP)-RELATED, ETC. |
| | INTERRUPT ENABLE REGISTER | REGISTER THAT SETS INTERRUPT ENABLE/DISABLE STATE | OTGC-RELATED, HC (PIPE)-RELATED, PC (EP)-RELATED, ETC. |
| BLOCK-RELATED REGISTERS | INTER-BLOCK COMMON REGISTER | REGISTER USED IN COMMON BETWEEN BLOCKS | BLOCK RESET INSTRUCTION, ETC. |
| | BLOCK REGISTERS | REGISTERS USED WITHIN THE Xcvr, OTGC, HC, AND PC BLOCKS | Xcvr CONTROL, OTGC STATE COMMAND, HC STATE COMMAND, FRAME NUMBER, ETC. |
| DMA CONTROL REGISTER | — | REGISTER FOR SETTINGS RELATING TO DMA CONTROL | DMA TRANSFER START INSTRUCTION, TOTAL SIZE OF DMA TRANSFER DATA, ETC. |

TRANSMISSION (DMA OR CPU --> PACKET BUFFER --> USB)

|    | WHEN USING DMA TRANSFER | WHEN USING CPU TRANSFER |
|----|-------------------------|-------------------------|
| WP | DMA                     | CPU                     |
| RP | USB                     | USB                     |

RECEPTION (USB --> PACKET BUFFER --> DMA OR CPU)

|    | WHEN USING DMA TRANSFER | WHEN USING CPU TRANSFER |
|----|-------------------------|-------------------------|
| WP | USB                     | USB                     |
| RP | DMA                     | CPU                     |

DATA TRANSFER CONTROL DEVICE FOR DATA TRANSFER OVER A BUS, ELECTRONIC EQUIPMENT AND METHOD FOR DATA TRANSFER OVER A BUS

Japanese Patent Application No. 2002-126880, filed on Apr. 26, 2002, is hereby incorporated by reference in its entirety.

BACKGROUND

The present invention relates to a data transfer control device, electronic equipment, and a data transfer control method.

The universal serial bus (USB) standard 2.0 is expanding well in the marketplace, but an interface standard called the USB On-The-Go (OTG) has been settled upon by the USB Implementers Forum (USB-IF). The OTG standard (OTG 1.0) that has been derived as an extension of USB 2.0 holds out the possibility of bringing new additional value to the USB interface, and it is expected that applications that make use of these characteristics will appear.

This OTG makes it possible to impart a host function to a peripheral (peripheral device) connected to a host (such as a personal computer) by existing USB. This makes it possible to transfer data between peripherals connected by USB, enabling direct connection between a digital camera and a printer, by way of example, so that an image from the digital camera can be printed. It is also possible to connect a digital camera or digital video camera to a storage device, to save data therein.

However, it is usual for a peripheral that is given the host function by OTG to have a limited-capability CPU (processing section) incorporated therein. The addition of the host function therefore places a heavy processing load on the CPU (firmware) of the peripheral, making processing complicated and raising further problems such as impeding other processes and lengthening the design period of the device.

Four types of transfer are defined by the various USB standards such as USB 1.1, USB 2.0, and OTG: isochronous transfer, bulk transfer, control transfer, and interrupt transfer. A USB host manages the transfer sequence of packets of each of these transfer types, and transfers packets of each transfer type while considering the remaining time in each frame. For that reason, the host performs frame management under USB, so that the host transfers a start-of-frame (SOF) packet to the peripheral every 1 ms at full speed (FS) or low speed (LS) or 125 µs at high speed (HS).

It has become clear that with non-periodic transfers such as bulk transfer or control transfer, however, the transfer of such a SOF packet has the result of reducing the bus bandwidth, which raises the problem of a drop in transfer efficiency.

SUMMARY

One aspect of the present invention relates to a data transfer control device for data transfer over a bus, the data transfer control device comprising:

a buffer controller which performs access control of a packet buffer storing transfer data; and a transfer controller which controls a transfer of packet buffer data, wherein the transfer controller performs data transfer while transferring a start-of-frame (SOF) packet at a frame period, when a first mode has been set, and disables a periodic transfer of a SOF packet and performs a transfer of non-periodic data, when a second mode has been set and also a transfer type is non-periodic transfer.

BRIEF DESCRIPTION OF THE SEVERAL VIEWS OF THE DRAWING

FIGS. 2A and 2B are illustrative of the SRP and HNP protocols.

FIGS. 5A and 5B are illustrative of pipe regions and endpoint regions.

FIGS. 6A and 6B are illustrative of SOF packets.

FIGS. 11A and 11B are truth tables illustrating the operation of the circuit of FIG. 10.

FIG. 14 is illustrative of the register section.

FIG. 16 shows a detailed example of the configuration of the buffer controller.

DETAILED DESCRIPTION OF THE EMBODIMENT

Figure 1A:
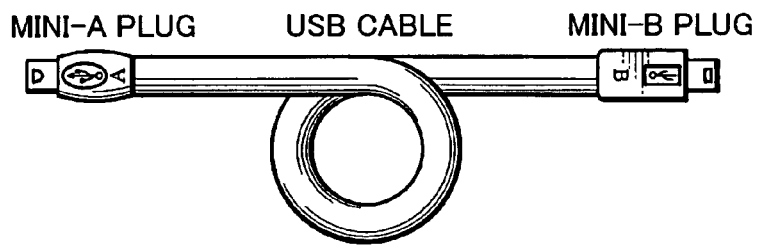
FIGS. 1A, 1B, and 1C are illustrative of the USB OTG standard.

Embodiments of the present invention are described below. Note that the embodiments described hereunder do not in any way limit the scope of the invention defined by the claims laid out herein. Note also that all of the elements of these embodiments should not be taken as essential requirements to the means of the present invention.

An embodiment of the present invention relates to a data transfer control device for data transfer over a bus, the data transfer control device comprising:

a buffer controller which performs access control of a packet buffer storing transfer data; and a transfer controller which controls a transfer of packet buffer data, wherein the transfer controller performs data transfer while transferring a start-of-frame (SOF) packet at a frame period, when a first mode has been set, and disables a periodic transfer of a SOF packet and performs a transfer of non-periodic data, when a second mode has been set and also a transfer type is non-periodic transfer.

With this embodiment, data transfer is performed while SOF packets are transferred at each frame period, when the first mode is set. This makes it possible to perform periodic transfer such as isochronous transfer as appropriate, by way of example. When the second mode has been set, on the other hand, the transfer of SOF packets is disabled and non-periodic data is transferred. This makes it possible to issue transactions that extend over the boundaries of a plurality of frames, enabling improvements in the transfer efficiency of non-periodic transfers such as bulk transfers and control transfers.

With this embodiment, the transfer controller may transfer a SOF packet at a frame period when there is no non-periodic data to be transferred, even when the second mode has been set.

This makes it possible to prevent a situation in which the other device connected to the bus transitions to an inappropriate state. Note the presence or absence of non-periodic data to be transferred can be determined by a transfer start instruction signal or a packet buffer full/empty signal, by way of example.

This embodiment may further comprise a state controller which controls a plurality of states including a state of a host operation, in which the data transfer control device operates as a role of a host, and a state of a peripheral operation, in which the data transfer control device operates as a role of a peripheral, a plurality of pipe regions may be allocated in the packet buffer, each of the pipe regions storing data transferred to or from corresponding one of endpoints, the transfer controller may include:

a host controller which performs data transfer as a host during the host operation; and a peripheral controller which performs data transfer as a peripheral during the peripheral operation, and the host controller may automatically issue a transaction with respect to one of the endpoints and may automatically transfer data between each of the pipe regions and corresponding one of the endpoints.

This embodiment makes it possible for the data transfer control device to play the role of host in the data transfer, using the host controller, by a state controller changing the state to the host operation state. If the state controlled by the state controller becomes the peripheral operation state, the device plays the role of peripheral in the data transfer, using the peripheral controller. This makes it possible to implement a function called a dual-role device.

With this embodiment, a plurality of pipe regions are allocated in the packet buffer during host operation, and data is transferred automatically between the allocated pipe regions and endpoints. This enables the implementation of the dual-role device function and enables a reduction in the processing load on the processing section during host operation.

With this embodiment, the host controller may automatically transfer non-periodic data between one of the pipe regions and an endpoint for non-periodic transfer corresponding to the one pipe region among the endpoints, while disabling the periodic transfer of a SOF packet, when the second mode has been set.

This makes it possible to use the pipe regions to transfer non-periodic data automatically to or from the endpoints, enabling more efficient data transfer. During this time, this embodiment disables the periodic transfer of SOF packets, thus enabling even more efficient data transfer. Note that if the transfer of SOF packets is disabled (if the second mode is set), it is preferable that an endpoint of a transfer type other than periodic transfer (such as isochronous transfer) is allocated to a pipe region allocated in the packet buffer.

With this embodiment, the host controller may automatically transfer a SOF packet at a frame period when all of automatic transfer instruction signals of the pipe regions are inactive, even when the second mode has been set.

Since this makes it possible to determine whether or not there is data to be transferred, based on automatic transfer instruction signals, it is possible to simplify the determination processing. If all of the automatic transfer instruction signals are inactive (if there is no data to be transferred), the transfer of a SOF packet makes it possible to prevent a situation in which the other device connected to the bus transitions to an inappropriate state.

With this embodiment, the host controller may comprise:

a SOF transfer start trigger generation circuit which makes a SOF transfer start trigger go active at each frame period, and makes the SOF transfer start trigger go inactive when a transfer of the SOF packet completes; and a SOF disable signal generation circuit which receives an automatic transfer instruction signal of each of the pipe regions, a state information signal from a state controller, and a signal indicating first or second mode, and generates a signal that disables the SOF transfer start trigger.

This makes it possible to implement processing to disable the transfer of SOF packets, with a simple circuit. Note that the configuration could be such that, if the state indicated by the state information signal is host operation, the second mode is instructed and at least one of the automatic transfer instruction signals becomes active, for example, the signal that disables the SOF transfer start trigger goes active and the generation of the SOF transfer start trigger is disabled. If the state indicated by the state information signal is host operation and all of the automatic transfer instruction signals are inactive (if there is no data to be transferred), the signal that disables the SOF transfer start trigger goes inactive and the generation of the SOF transfer start trigger is not disabled, even if the second mode is instructed.

With this embodiment, during peripheral operation, a plurality of endpoint regions may be allocated to the packet buffer, each of the endpoint regions storing data transferred to or from the host, and the peripheral controller may transfer data between the endpoint regions and the host.

This makes it possible to use the buffer regions of the packet buffer as pipe regions during host operation and as endpoint regions during peripheral operation. This enables efficient usage of the resources of the packet buffer and reduces the processing load on the processing section.

With this embodiment, the non-periodic transfer may be bulk transfer or control transfer in accordance with the universal serial bus (USB) standard and the non-periodic data is bulk data or control data.

With this embodiment, data transfer conforming to the universal serial bus (USB) on-the-go (OTG) standard may be performed.

An embodiment of the present invention also relates to electronic equipment comprising:

any of the above-described data transfer control devices;

a device which performs output processing, fetch processing, or storage processing on data to be transferred through the data transfer control device and bus; and a processing section which controls data transfer of the data transfer control device.

An embodiment of the present invention further relates to a data transfer control method for data transfer through a bus, the method comprising:

performing access control of a packet buffer which stores transfer data;

controlling a transfer of packet buffer data; and performing data transfer while transferring a start-of-frame (SOF) packet at a frame period, when a first mode has been set, and disabling a periodic transfer of a SOF packet and performing a transfer of non-periodic data, when a second mode has been set and also a transfer type is non-periodic transfer.

This embodiment is described below with reference to the accompanying figures.

1. OTG

The USB on-the-go (OTG) function will first be briefly described.

1.1 A-Device and B-Device

With OTG, the Mini-A plug and Mini-B plug are defined as standard connectors, as shown in FIG. 1A. Mini-AB receptacles are defined as connectors that enable connection for both of these Mini-A and Mini-B plugs (broadly speaking: first and second plugs of a cable).

Figure 1B:
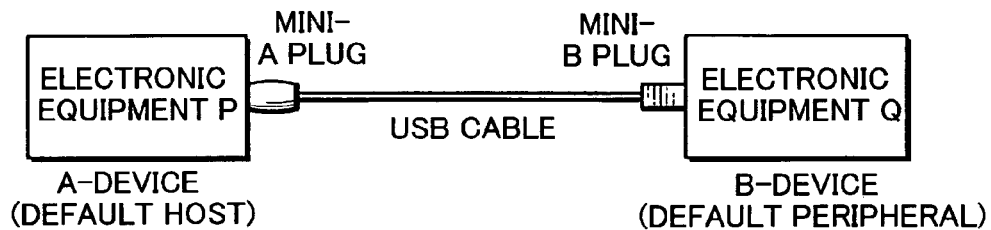
Figure 1C:
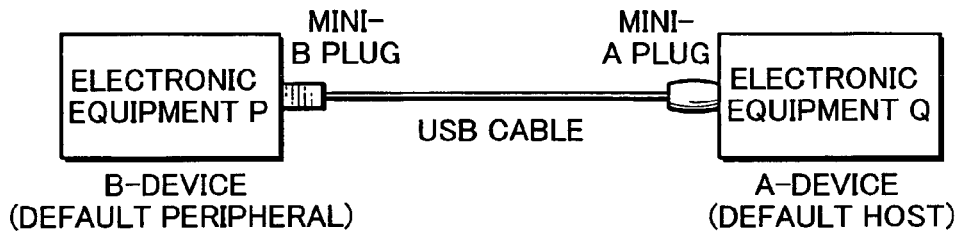

If the Mini-A plug of a USB cable is connected to electronic equipment P and the Mini-B plug is connected to electronic equipment Q, as shown in FIG. 1B byway of example, the electronic equipment P is set to be the A-device and the electronic equipment Q is set to be the B-device. If the Mini-B plug and Mini-A plug are connected to electronic equipment P and Q as shown in FIG. 1C, on the other hand, electronic equipment P and Q are set to be the B-device and the A-device, respectively.

An ID pin in the Mini-A plug is connected to ground and an ID pin in the Mini-B plug is in a floating state. Each piece of electronic equipment can determined whether a Mini-A plug or a Mini-B plug is connected to it, by using a built-in pull-up resistor circuit to detect the voltage level of that ID pin.

With OTG, the A-device (master) becomes the side (supply source) that supplies power (VBUS) and the B-device (slave) becomes the side that receives power (supply destination). The default state of the A-device is host and the default state of the B-device is peripheral.

1.2 Dual-Role Device

OTG enables the definition of a dual-role device that can perform both the role of a host (simple host) and the role of a peripheral.

A dual-role device can be either host or peripheral. The partner connected to the dual-role device determines the role of the dual-role device uniquely, depending on whether it is a host or peripheral under the prior-art USB standard. In other words, if the connected partner is a host, the dual-role device becomes a peripheral, whereas if the connected partner is a peripheral, the dual-role device becomes a host.

If the connected partner is also a dual-role device, on the other hand, the two dual-role devices can negotiate the roles of host and peripheral between themselves.

1.3 SRP and HNP

A dual-role device has session request protocol SRP and host negotiation protocol HNP functions, as shown in FIGS. 2A and 2B.

In this case, the session request protocol SRP is a protocol by which the B-device requests the supply of VBUS (power) from the A-device.

With OTG, if no bus is used, the A-device can halt the supply of VBUS. This makes it possible to prevent wasteful power consumption when the A-device is a small portable device, by way of example. If the B-device requires the supply of VBUS after the A-device has stopped the supply of VBUS, this SRP can be used to request the restart of the VBUS supply from the A-device.

The SRP flow is shown in FIG. 2A. As shown in FIG. 2A, the B-device requests the VBUS supply from the A-device by performing data line pulsing and VBUS pulsing. If the B-device operates as a peripheral after the supply of VBUS by the A-device has started, the A-device starts operating as the host.

As described with reference to FIGS. 1A to 1C, if dual-role devices are connected together, the A-device that is the side connected to the Mini-A plug becomes the default host and the B-device that is the side connected to the Mini-B plug becomes the default peripheral. With OTG, the host and peripheral roles can be switched without removing the plugs. HNP is a protocol that enables switching of the host and peripheral roles.

The HNP flow is shown in FIG. 2B. If the A-device, which is operating as host by default, stops using the bus, the bus goes into an idle state. When the B-device subsequently disables a pull-up resistor of a data signal line DP (D+), the A-device enables the pull-up resistor of DP. This changes the role of the A-device from host to peripheral, starting the operation thereof as a peripheral. The role of the B-device changes from peripheral to host, starting the operation thereof as a host.

If the B-device subsequently stops using the bus and the A-device disables its DP pull-up resistor, the B-device enables its DP pull-up resistor. This returns the role of the B-device from host to peripheral, restarting the operation thereof as peripheral. The role of the A-device returns from peripheral to host, starting the operation thereof as host.

The above-described OTG makes it possible for portable devices such as mobile phones and digital cameras to operate as USB hosts, enabling data transfer between portable devices connected in a peer-to-peer fashion. This makes it possible to add more value to the USB interface, enabling the production of applications that could not exist up before.

2. OHCI with conventional USB, a data transfer control device (host controller) of a personal computer that acts as host conforms to a standard such as the open host controller interface (OHCI) or universal host controller interface (UHCI) proposed by Microsoft. The operating systems (OSs) that is used therefor are limited to OSs such as Windows produced by Microsoft and the Macintosh OSs produced by Apple.

However, there is an infinite variety of incorporated CPUs and architectures in the small portable devices that are target applications of OTG, as well as the OSs used therein. In addition, the versions of OHCI or UHCI that have been standardized towards the host controllers of personal computers have the prerequisite that they will be installed to function completely as USB hosts, so it is difficult to say that they can be installed in small portable devices.

Figure 3A:
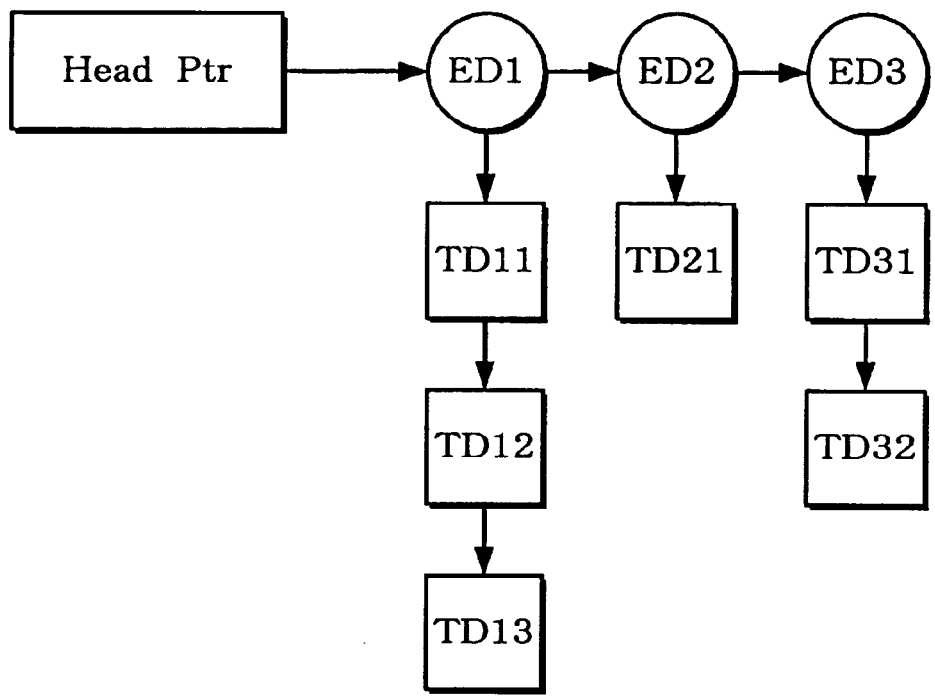
FIGS. 3A and 3B are illustrative of the OHCI list structure type descriptor.

An example of the list structure type descriptor used by OHCI is shown in FIG. 3A.

In FIG. 3A, endpoint descriptors ED1, ED2, and ED3 are linked by link pointers and include information that is necessary for communication between end points 1, 2, and 3. Transfer descriptors TD11 to TD13, TD21, and TD31 to TD32 are linked to ED1, ED2, and ED3 by further link pointers. Information that is necessary for packet data transferred between the endpoints 1, 2, and 3 is included within these transfer descriptors.

Figure 3B:
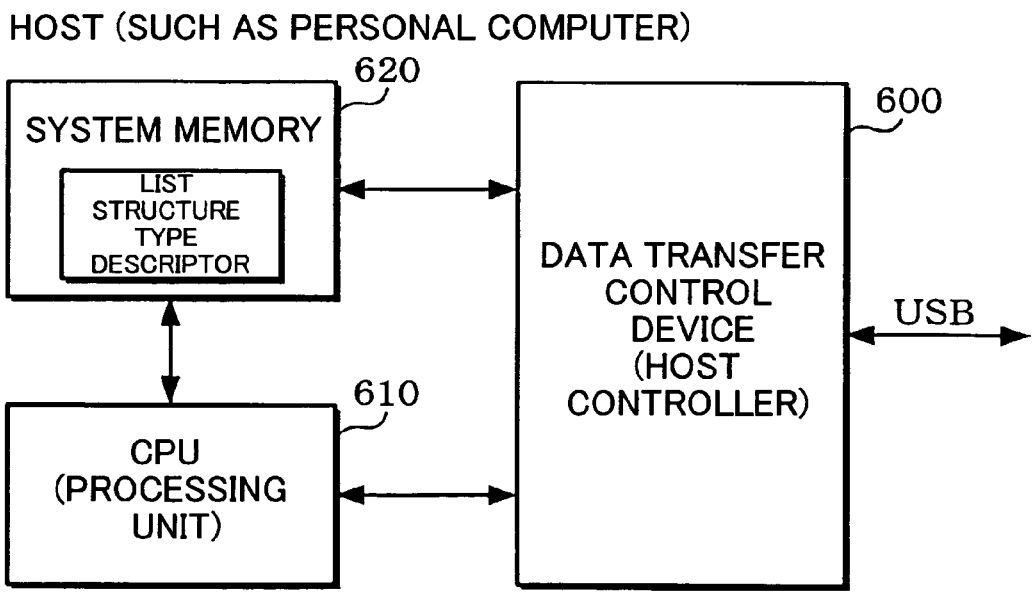

The list structure type descriptors of FIG. 3A are created by firmware (host controller/driver) operating on a CPU 610 (broadly speaking: a processing unit) shown in FIG. 3B, and are written to system memory 620. In other words, the firmware allocates endpoint descriptors to endpoints within the system, and creates endpoint descriptors and transfer descriptors based on endpoint information. These descriptors are linked by link pointers and are written to the system memory 620.

A data transfer control device 600 (host controller) reads the list structure type descriptors that were written to the system memory 620, and performs data transfer based on the information written in the endpoint descriptors and transfer descriptors.

Specifically, the data transfer control device 600 (host controller) bases the setting of information for endpoint 1 on ED1, and transfers data to and from endpoint 1 based on TD11 that is linked to ED1. Next, it bases the setting of information for endpoint 2 on ED2, and transfers data to and from endpoint 2 based on TD21 that is linked to ED2. Similarly, the data transfer control device 600 performs data transfer based on TD31, TD12, TD32, and TD13.

In the manner described above, the firmware (host controller/driver) operating in the CPU of a data transfer control device (host controller) conforming to OHCI has to create descriptors of the complicated structure shown in FIG. 3A. The processing load on the CPU is therefore extremely high.

In such a case, the only device that can be allocated the role of host under the prior-art USB is a personal computer, and that personal computer has to have a high-performance CPU. It is therefore possible to have spare capacity therein, even during the creation of descriptors of the complicated structure shown in FIG. 3A.

However, the CPU (embedded CPU) incorporated into a small portable device (such as a digital camera or mobile phone), which is the target application for OTG, generally has a much lower level of capabilities than the CPU of a personal computer. If a portable device is to operate as an OTG host, therefore, a large load is placed on the CPU incorporated in the portable device, which impedes other processes and causes problems such as a deterioration in performance.

3. Configurational Example

Figure 4:
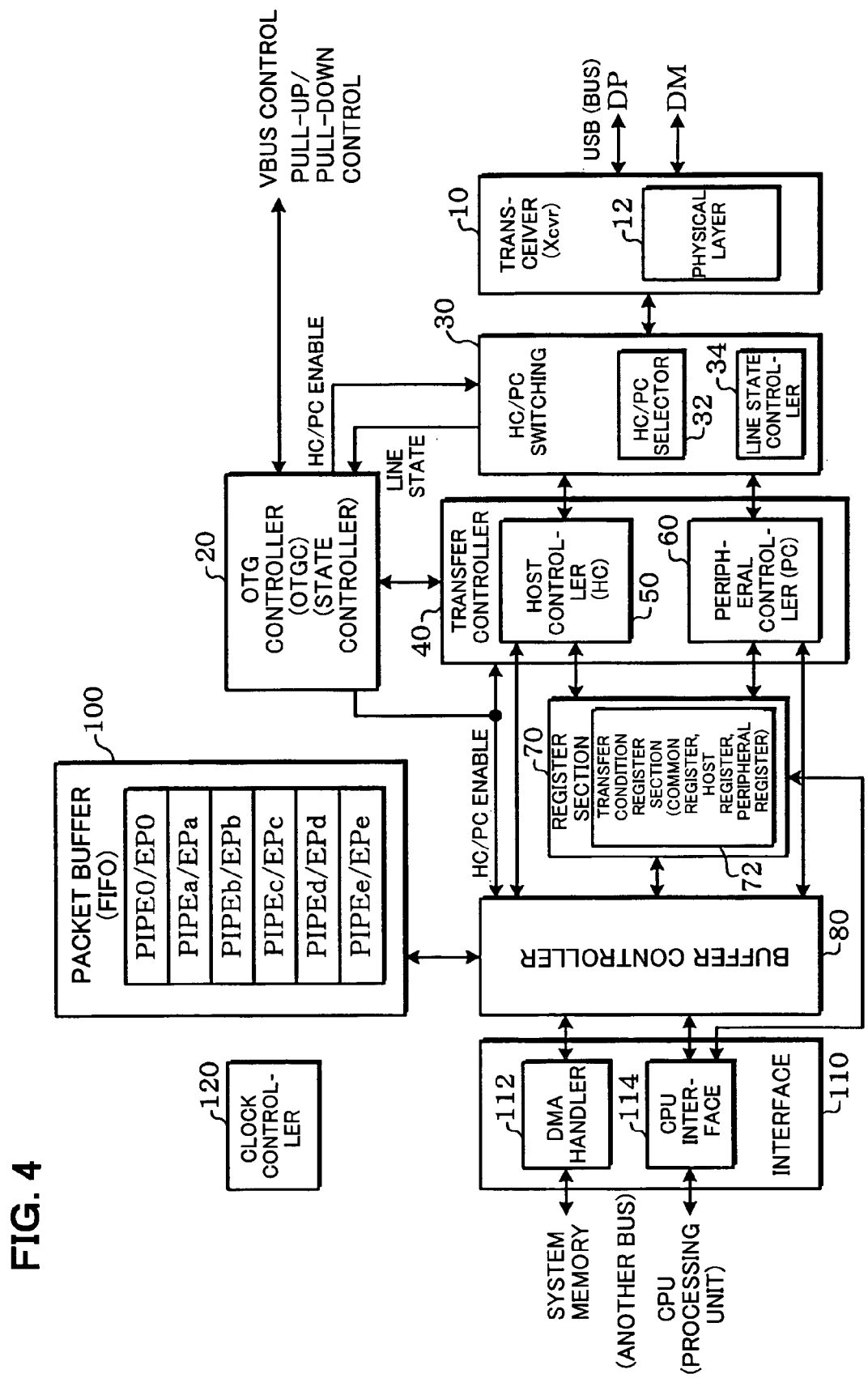
FIG. 4 shows an example of the configuration of a data transfer control device in accordance with one embodiment of the present invention.

An example of the configuration of a data transfer control device in accordance with this embodiment that can solve the above problem is shown in FIG. 4. Note that the data transfer control device of this embodiment need not necessarily-have all the circuit blocks shown in FIG. 4; some of those circuit blocks can be omitted.

A transceiver 10 (hereinafter called a Xcvr as appropriate) is a circuit for transmitting and receiving USB (broadly speaking: a bus) data, using differential data signals DP and DM, and it includes a USB physical-layer (PHY) circuit 12. More specifically, the transceiver 10 creates line states (such as J, K, and SE0) for DP and DM, and performs serial-to-parallel conversion, parallel-to-serial conversion, bit stuffing, bit unstuffing, NRZI decoding, and NRZI encoding. Note that the transceiver 10 could be provided outside of the data transfer control device.

An OTG controller 20 (broadly speaking: a state controller, hereinafter called OTGC as appropriate) performs various processes for implementing OTG SRP and HNP functions (see FIGS. 2A and 2B). In other words, the OTG controller 20 controls a plurality of states including a state for host operation in which the device is operating as host and a state for peripheral operation in which the device is operating as a peripheral.

More specifically, state transitions for when the dual-role device is operating as the A-device (see FIGS. 1B and 1C) and state transitions for when it is operating as the B-device are defined within the OTG standard. The OTG controller 20 includes a state machine for implementing these state transitions. The OTG controller 20 includes circuits that detect (monitor) the USB line state, the VBUS level, and the ID pin state. The state machine included by the OTG controller 20 causes changes in these states (states such as suspension or idle in the host or peripheral), based on the thus-detected information. The state transitions in this case could be implemented by hardware circuitry or they could be implemented by the firmware setting state commands in the registers. When the state changes, the OTG controller 20 controls VBUS and connects/disconnects the DP and DM pull-up/pull-down resistors, based on the post-transition state. A host controller 50 (hereinafter called HC as appropriate) controls the enabling/disabling of a peripheral controller 60 (hereinafter called PC as appropriate).

An HC/PC switching circuit 30 (HC/PC common circuit) performs switching control over the connections with the host controller 50 or the peripheral controller 60. It also instructs the creation of USB data (DP and DM) line states, to the transceiver 10. Note that the connection switching control is implemented by an HC/PC selector 32 and the instruction for the creation of line states is implemented by a line state controller 34.

If the OTG controller 20 makes the HC enable signal go active during host operation (in the host state), by way of example, the HC/PC switching circuit 30 (the HC/PC selector 32) connects the transceiver 10 and the host controller 50. If the OTG controller 20 makes the PC enable signal go active during peripheral operation (in the peripheral state), on the other hand, the HC/PC switching circuit 30 connects the transceiver 10 and the peripheral controller 60. This makes it possible for the host controller 50 and the peripheral controller 60 to operate exclusively.

A transfer controller 40 is a circuit that controls data transfer through USB (broadly speaking: a bus), and it includes the host controller 50 (HC) and the peripheral controller 60 (PC).

In this case, the host controller 50 is a circuit that controls data transfer in the role of host during host operation (when the HC enable signal from the OTG controller 20 is active).

In other words, the host controller 50 is connected to the transceiver 10 by the HC/PC switching circuit 30 during host operation. The host controller 50 automatically generates transactions with respect to endpoints, based on transfer condition information that has been set in a transfer condition register section 72 of the register section 70. Automatic transfer (data transfer by hardware circuitry, without any intervention by the processing section) of data (packets) is performed between pipe regions (PIPE0 to PIPEe, hereinafter called PIPE as appropriate), which are allocated in a packet buffer 100, and endpoints corresponding to those pipe regions.

More specifically, the host controller 50 performs functions such as arbitration between a plurality of pipe transfers, time management in frames, transfer scheduling, and re-send management. It also manages transfer condition information (operation information) for pipe transfers, through the register section 70. It also manages transactions, creates or analyzes packets, and instructs the creation of suspend/resume/reset states.

The peripheral controller 60, on the other hand, is a circuit that controls data transfer in the role of a peripheral during peripheral operation (when the PC enable signal from the OTG controller 20 is active).

In other words, the peripheral controller 60 is connected to the transceiver 10 by the HC/PC switching circuit 30 during peripheral operation. It transfers data between end point regions (EP0 to EPe, hereinafter called EPs as appropriate) that have been allocated in the packet buffer 100, based on transfer condition information that has been set in the transfer condition register section 72 of the register section 70.

More specifically, the peripheral controller 60 manages transfer condition information (operation information) for endpoint transfers, through the register section 70. It also manages transactions, creates or analyzes packets, and instructs the creation of remote wake-up signals.

Note that an endpoint can have a unique address allocated thereto and is a point (portion) on the peripheral (device). All data transfer between the host and peripheral (device) is done through these endpoints. A transaction is configured of a token packet, an optional data packet, and an optional handshake packet.

The register section 70 includes various registers for performing actions such as data transfer (pipe transfer, endpoint transfer) control, buffer access control, buffer management, interrupt control, block control, or DMA control. Note that the registers within the register section 70 could be implemented by memory such as RAM, or by D flip-flops or the like. The registers of the register section 70 need not be in a single bank, but could be disposed separately in blocks (such as HC, PC, OTGC, and Xcvr).

The register section 70 includes the transfer condition register section 72. This the transfer condition register section 72 includes registers that store transfer condition information (transfer control information) for data transfer between pipe regions (PIPE0 to PIPEe) allocated in the packet buffer 100 and endpoints, during host operation. These transfer condition registers are provided to correspond to the pipe regions of the packet buffer 100.

Note that when the device is operating as a peripheral, endpoint regions (EP0 to EPe) are allocated in the packet buffer 100. Data transfer between the data transfer control device and the host is based on the transfer condition information that has been set in the transfer condition register section 72.

A buffer controller 80 (FIFO manager) performs access (read/write) control and region management for the packet buffer 100. More specifically, it creates and manages accesses addresses for the packet buffer 100, for the CPU (broadly speaking: a processing section, direct memory access (DMA), and USB. It also arbitrates accesses to the packet buffer 100 by the CPU, DMA, and USB.

When the device is operating as host, by way of example, the buffer controller 80 sets (establishes) a data transfer path between an interface circuit 110 (CPU or DMA) and the packet buffer 100 and another data transfer path between the packet buffer 100 and the host controller 50 (USB).

When the device is operating as a peripheral, on the other hand, the buffer controller 80 sets a data transfer path between the interface circuit 110 (CPU or DMA) and the packet buffer 100 and another data transfer path between the packet buffer 100 and the peripheral controller 60 (USB).

The packet buffer 100 (FIFO, packet memory, and buffer) is intended to temporarily store (buffer) data (transmission data or reception data) that is being transferred by USB. This packet buffer 100 could be configured of random access memory (RAM), by way of example. Note that the packet buffer 100 could be provided outside of the data transfer control device (it could also be externally attached memory).

During host operation, the packet buffer 100 is used as a first-in, first-out (FIFO) for pipe transfer. In other words, pipe regions PIPE0 to PIPEe (broadly speaking: buffer regions) are allocated in a manner to correspond to the USB (bus) endpoints. Within the pipe regions PIPE0 to PIPEe is stored data (transmission data or reception data) to be transferred with respect to the corresponding endpoints.

During peripheral operation, on the other hand, the packet buffer 100 is used as a FIFO for endpoint transfer. In other words, endpoint regions EP0 to EPe (broadly speaking: buffer regions) are allocated in the packet buffer 100. Within the endpoint regions EP0 to EPe is stored data (transmission data or reception data) to be transferred with respect to the host.

Note that the buffer regions allocated in the packet buffer 100 (the regions set to pipe regions during host operation or endpoint regions during peripheral operation) are set to be regions in which the information that is input thereto first is output therefrom first (FIFO regions).

PIPE0 is a pipe region that is dedicated to endpoint 0 for control transfer, and PIPEa to PIPEe are general-purpose pipe regions that can be allocated to any endpoints.

In other words, with USB, endpoint 0 is set to be a dedicated endpoint for control transfer. It is therefore possible to prevent confusion in the user, by setting PIPE0 to be a dedicated pipe region for control transfer, as in this embodiment. It is also possible to modify the pipe region dynamically to correspond to the endpoints, by having PIPEa to PIPEe as pipe regions that can be allocated to any endpoints. This makes it possible to increase the degree of freedom of pipe transfer scheduling, thus enabling more efficient data transfer.

Note that the region size RSize of the buffer region (pipe region or end point region) of this embodiment is set by the maximum packet size MaxPktSize (broadly speaking: page size) and the number of pages BufferPage (RSize=MaxPktSize×BufferPage). This makes it possible to set the region size and number of pages of the buffer region as required, enabling more efficient usage of the resources of the packet buffer 100.

The interface circuit 110 is a circuit that performs data transfer between a DMA (system memory) bus or CPU bus, which are other buses that differ from USB, and the packet buffer 100. This interface circuit 110 includes a DMA handler circuit 112 for performing DMA transfers between the packet buffer 100 and external system memory. It also includes a CPU interface circuit 114 for performing parallel I/0 (PIO) transfers between the packet buffer 100 and an external CPU. Note that the CPU (processing section) could also be incorporated in the data transfer control device.

A clock controller 120 generates various clocks used within the data transfer control device, based on a built-in PLL or an external input clock.

4. Pipe Regions

With this embodiment, pipe regions PIPE0 to PIPEe are allocated in the packet buffer 100 during host operation, as shown in FIG. 5A. Data is transferred between these pipe regions PIPE0 to PIPEe and endpoints in the peripheral.

In this case, the "pipe" of the pipe region of this embodiment has a slightly different meaning from the "pipe" defined by USB (a logical abstraction expressing a linkage between an endpoint on the device and software on the host, or a logical path).

A pipe region in accordance with this embodiment is allocated in the packet buffer 100 to correspond to each endpoint possessed by a peripheral connected by USB (bus), as shown in FIG. 5A. As shown in FIG. 5A by way of example, pipe region PIPEa corresponds to endpoint 1 (bulk IN) of peripheral 1 and pipe region PIPEb corresponds to endpoint 2 (bulk OUT) of peripheral 1. Similarly, pipe region PIPEc corresponds to endpoint 1 (bulk IN) of peripheral 2 and pipe region PIPEd corresponds to endpoint 2 (bulk OUT) of peripheral 2. Furthermore, PIPEe corresponds to endpoint 1 (interrupt IN) of peripheral 3. Note that PIPE0 is a pipe region that is dedicated to endpoint 0 for control transfer.

In the example shown in FIG. 5A, USB bulk IN transfer is done between pipe region PIPEa and endpoint 1 of peripheral 1 and bulk OUT transfer is done between PIPEb and endpoint 2 of peripheral 1. Similarly, bulk IN transfer is done between PIPEc and endpoint 1 of peripheral 2 and bulk OUT transfer is done between PIPd and endpoint 2 of peripheral 2. Furthermore, interrupt IN transfer is done between PIPEe and endpoint 1 of peripheral 3.

With this embodiment as configured above, any data transfer (isochronous transfer, bulk transfer, or interrupt transfer) can be done between a pipe region (general-purpose) and the corresponding endpoint.

With this embodiment, data of a given data unit (a data unit determined by the total size) is transferred between a pipe region and the corresponding endpoint. A data unit in this case could be considered to be a data unit for a transfer requested by an I/O request packet (IRP) or such a data unit that has been divided into a unit of a suitable size, by way of example. A data transfer of such a data unit (a series of transactions) with respect to an endpoint can be called a "pipe" in accordance with this embodiment. A region in which this "pipe" of data (transmission data or reception data) is stored forms a pipe region.

Once the transfer of a given data unit through a pipe region has ended, that pipe region can be released. The released pipe region can then be allocated to any endpoint. With this embodiment as configured above, the correspondences between pipe regions and endpoints can be changed dynamically.

When the device of this embodiment is operating as a peripheral, endpoint regions EP0 to EPe are allocated (set) in the packet buffer 100, as shown in FIG. 5B. Data is then transferred between these endpoint regions EP0 to EPe and the host (host controller or system memory).

With this embodiment as configured above, the buffer region of the packet buffer 100 is allocated as pipe regions during host operation or as endpoint regions during peripheral operation. This makes it possible to use the packet buffer 100 resources in common during host operation and during peripheral operation, enabling a saving in usable storage capacity of the packet buffer 100.

Note that the number of pipe regions and endpoint regions is not limited to six and thus can be any number.

5. Non-SOF Mode (Transfer Mode for Non-SOF Bulk Only)

Four types of transfer are defined by the various USB standards (such as USB 1.1, USB 2.0, and OTG): isochronous, bulk, control, and interrupt. A USB host controls and manages the transfer sequence of packets of each of these transfer types, and instructs the transfer of packets of each transfer type. For that reason, the host performs frame management under USB, so that host transfers a start-of-frame (SOF) packet to the peripheral every frame (1 ms or 125 μs), as shown in FIG. 6A.

Note that the SOF is a token packet that indicates the start of a frame, and it includes a PID, frame number, and CRC. The host transmits this SOF. The host performs scheduling to ensure that one transaction does not extend over a plurality of frames. A frame is the interval between one SOF and the next SOF. Bulk transfer is a method by which large volumes of data, such as print data or image data, is transferred non-periodically.

With isochronous transfers and interrupt transfers, which are periodic (synchronized) transfers, information such as frame timing and frame numbering imparts important meanings. The SOF packets that convey that information are therefore necessary.

With bulk transfers and control transfers, which are non-periodic transfers, on the other hand, this information is not considered to be particularly necessary, but the host still requests the transfers of SOF packets even with such non-periodic transfers.

If a SOF packet is transferred in a non-periodic transfer such as a bulk transfer, however, the transfer of that SOF packet will consume some bus bandwidth in itself. Furthermore, the presence of such a SOF packet under USB will create a transfer inhibited period (transfer inhibited region) at the end of the frame, as shown in FIG. 6B, which will further reduce the bus bandwidth.

USB is used for a wide range of applications (such as the transfer of print data with a printer, the transfer of image data with a camera, and the transfer of storage data with a storage device) in which bulk transfer is used for the transfer of such data. If bus bandwidth in these bulk transfers is reduced by the SOF packets that have not been necessary up until now, therefore, this will be a wasteful consumption of resources.

With this embodiment of the invention, a method is employed to disable (cancel) the transfer of SOF packets (packets indicating frame start) in non-periodic transfers such as bulk transfers.

More specifically, if a with-SOF mode (broadly speaking: a first mode) has been set, data transfer proceeds while a SOF packet (a SOF token packet) is transferred every frame period. If a non-SOF mode (broadly speaking: a second mode) has been set and the transfer is a non-periodic transfer (such as a bulk transfer or control transfer), on the other hand, the periodic transfer of SOF packets is disabled and non-periodic data (such as bulk data or control data) is transferred.

Figure 7:
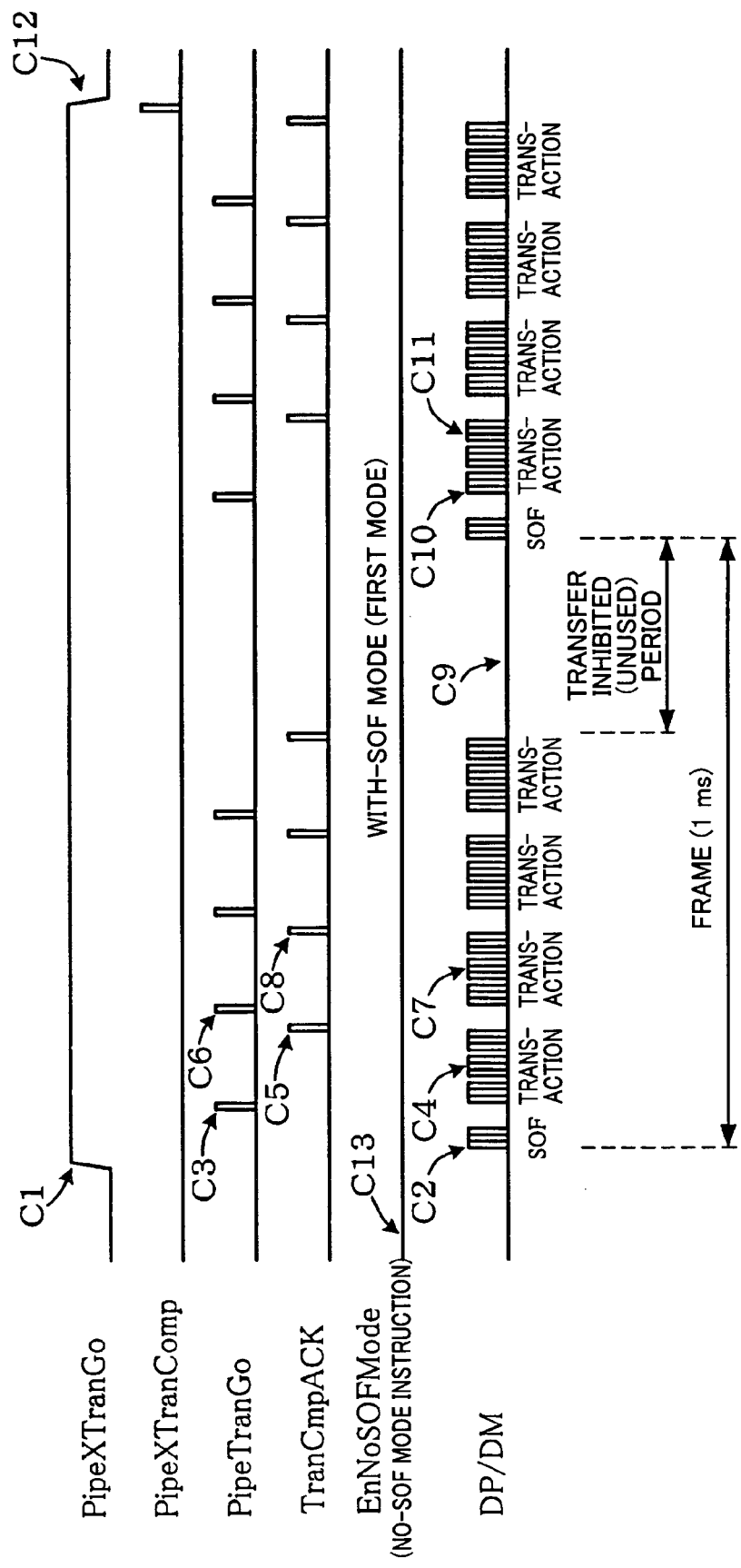
FIG. 7 shows examples of signal waveforms when a with-SOF mode (first mode) is set.
Figure 8:
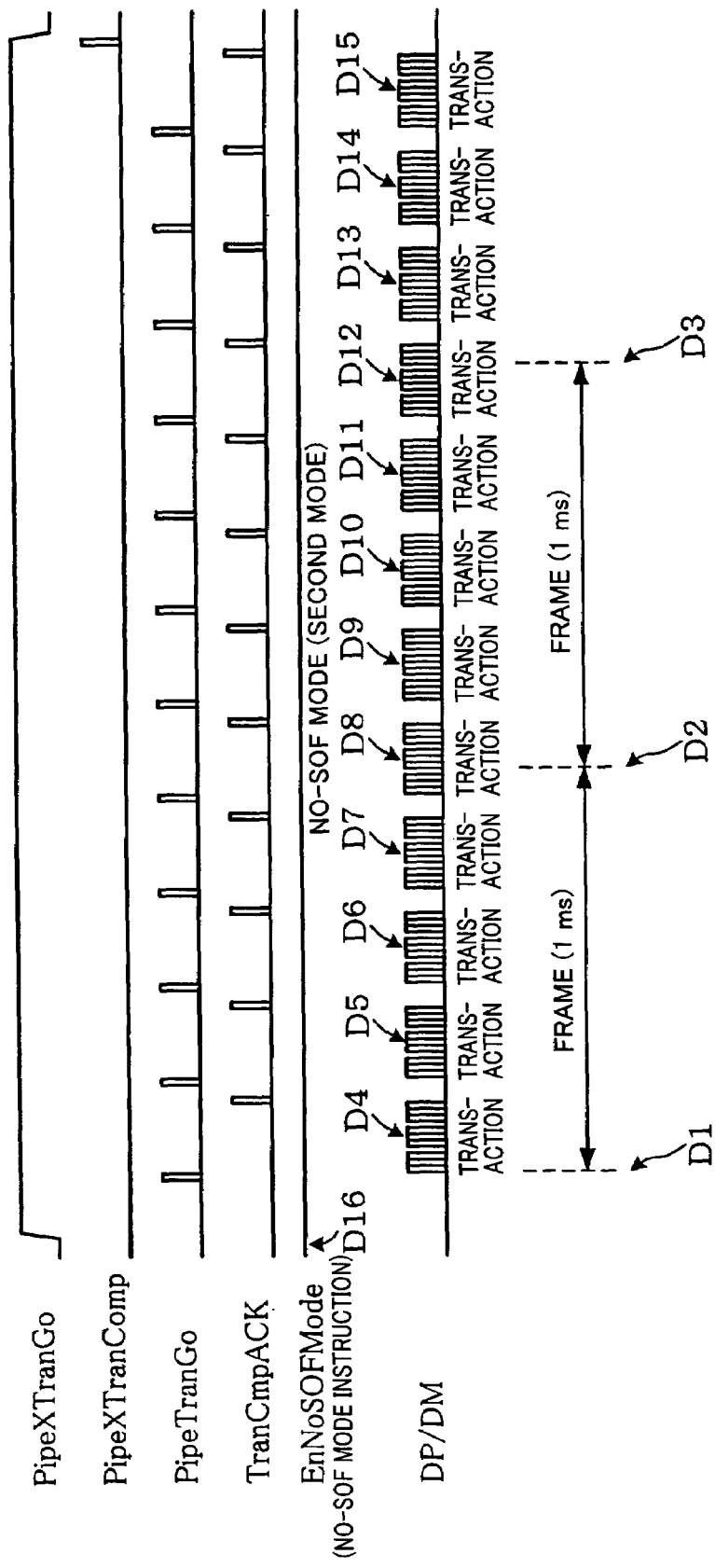
FIG. 8 shows examples of signal waveforms when a non-SOF mode (second mode) is set.
Figure 9:
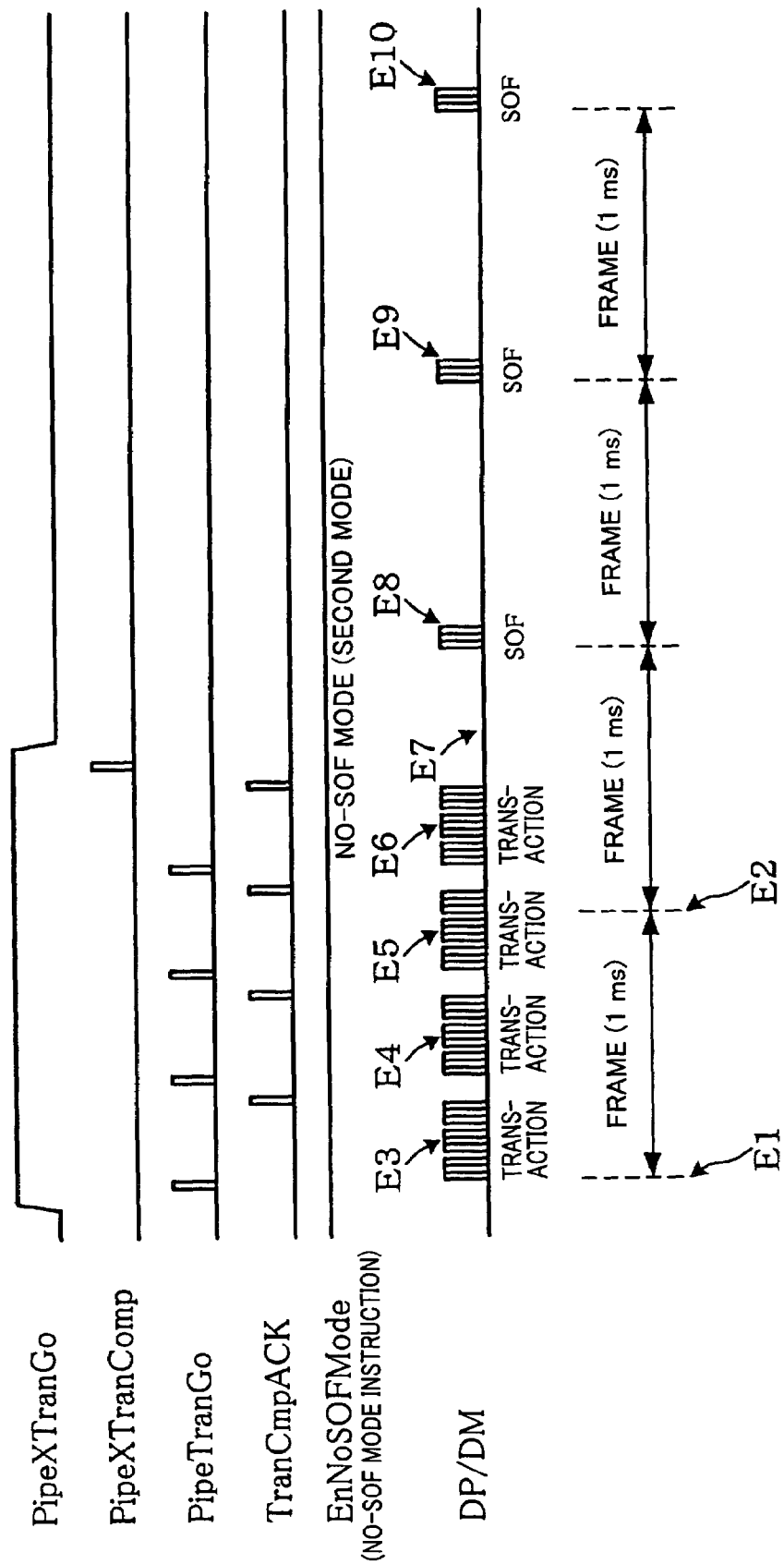
FIG. 9 shows examples of signal waveforms when the non-SOF mode has been set and there is no data to be transferred.

Examples of signal waveforms for data transfer in accordance with this embodiment are shown in FIGS. 7, 8, and 9.

If an automatic transaction start instruction is issued by the firmware (processing section), as shown by way of example in FIG. 7, PipeXTranGo (a transfer request signal from the firmware in Pipex) goes active, as shown at C1. This starts the automatic transaction processing by the host controller 50 in this PipeX (where X=0 to e).

In this case, EnNoSOFMode (non-SOF mode specification, the transfer mode specification for non-SOF bulk only) goes inactive (low) and with-SOF mode (the first mode) is set. In this case, therefore, the host controller 50 (broadly speaking: a transfer controller, hereinafter the same) generates a SOF packet and transfers it to the peripheral, as shown at C2.

PipeTranGo (a transfer request signal from the HC sequence management circuit within the host controller 50) then goes active, as shown at C3, and the host controller 50 automatically issues a transaction and transfers packets, as shown at C4. This transaction is configured of a token packet, an optional data packet, and an optional handshake packet. When this transaction ends, TranCmpACK goes active at C5. PipeTranGo then goes active at C6, the next transaction starts at C7, then TranCmpACK goes active at the end of that transaction at C8.

In the above-described manner, the host controller 50 automatically issues a series of transactions and automatically transfers the packets that configure those transactions. When the remaining frame time runs low and the transfer inhibited period occurs, as shown at C9, the issue of transactions for that frame ends.

In other words, USB provides a transfer inhibited period at frame end, where the transfer of packets is inhibited during that period. For that reason, the host controller 50 does not issue transactions during that transfer inhibited period. After one frame (1 ms) interval has elapsed from the transfer of the previous SOF at C2, the next SOF is transferred at C10. This causes the start of the next frame and the host controller 50 automatically issues transactions for the next frame, as shown at C11.

When with-SOF mode is set with this embodiment configured as above, SOF packets are issued periodically for each frame at C2 and C10, for transfer to the peripheral. This makes it possible to perform periodic transfers such as isochronous transfers as appropriate.

When EnNoSOFMode is active (high) with this embodiment, as shown in FIG. 8, a non-SOF mode (second mode) is set. When that happens, the host controller 50 is configured to perform periodic transfers of SOF packets, as shown at D1, D2, and D3. Bulk transfer transactions are then executed without breaks, as shown at D4 to D15.

In other words, no transactions are executed (no packets are transferred) during the transfer inhibited period shown at C9 in the with-SOF mode of FIG. 7.

In contrast thereto, transactions are executed continuously in the non-SOF mode of FIG. 8 (the transfer mode for non-SOF bulk transfers only), even during the transfer inhibited period. No SOF packet is transferred at the frame start timing shown at D2, and transactions are executed even during the SOF transfer period shown at D8.

As is clear from a comparison of FIGS. 7 and 8, this configuration makes it possible to allocate to bulk transfer a period (bandwidth) that combines the SOF packet transfer period and the transfer inhibited period (inhibited region) at the end of the frame, during bulk transfer (transfer for bulk only). In other words, it is possible to issue a transaction that extends over a plurality of frames. This increases the bus bandwidth, improving the transfer efficiency.

Note that when non-SOF mode is set, the transfer type of the pipe region of FIG. 5A is preferably set to bulk transfer (non-periodic transfer). In other words, the configuration is such that the firmware or the like does not set the transfer type of the pipe region to a periodic transfer type such as isochronous transfer or interrupt transfer. This enables the implementation of appropriate periodic transfer.

6. SOF Issue with No Transfer Data

Depending on the situation of the application, it can happen that it becomes impossible to execute continuous bulk transfer without breaks as shown in FIG. 8, generating a state in which there is no data to be transferred within a certain period.

If non-SOF mode has been set in such a case, there is a danger that there will be no bus activity and the peripheral (device) state might change to suspended.

This embodiment of the invention is configured in such a manner that, if there is no bulk (non-periodic) data to be transferred, a SOF packet is transferred in the frame period, even if the non-SOF mode (second mode) has been set.

In other words, EnNoBulkMode goes active (high) to set non-SOF mode, as shown in FIG. 9. Therefore, although no SOF packets are issued at E1 and E2, the bulk transfer transaction is executed continuously as shown at E3 to E6.

As shown at E7 in FIG. 9, the continuous execution of transactions causes the data to be transferred (transactions to be executed) to run out. In such a case, this embodiment of the invention ensures that the host controller 50 automatically transfers SOF packets to the peripheral even though non-SOF mode is set, as shown at E8, E9, and E10. The transfer of these SOF packets makes it possible to prevent a state in which bus activity occurs, enabling the implementation of appropriate data transfer.

Note that the detection of whether or not there is data to be transferred could be determined by an automatic transaction start instruction signal, for example, or by monitoring the state of the packet buffer 100 (by a full/empty signal).

More specifically, it is determined that there is no data to be transferred when all of the automatic transfer start instruction signals (PipeXTranGo: where X=0 to e) for pipe regions PIPE0 to PIPEe are inactive, by way of example. If this has been determined, a SOF packet is transferred automatically, even if non-SOF mode has been set. This makes it possible to determine whether or not there is data to be transferred, in a simple manner with a small processing load.

7. Circuit Example

Figure 10:
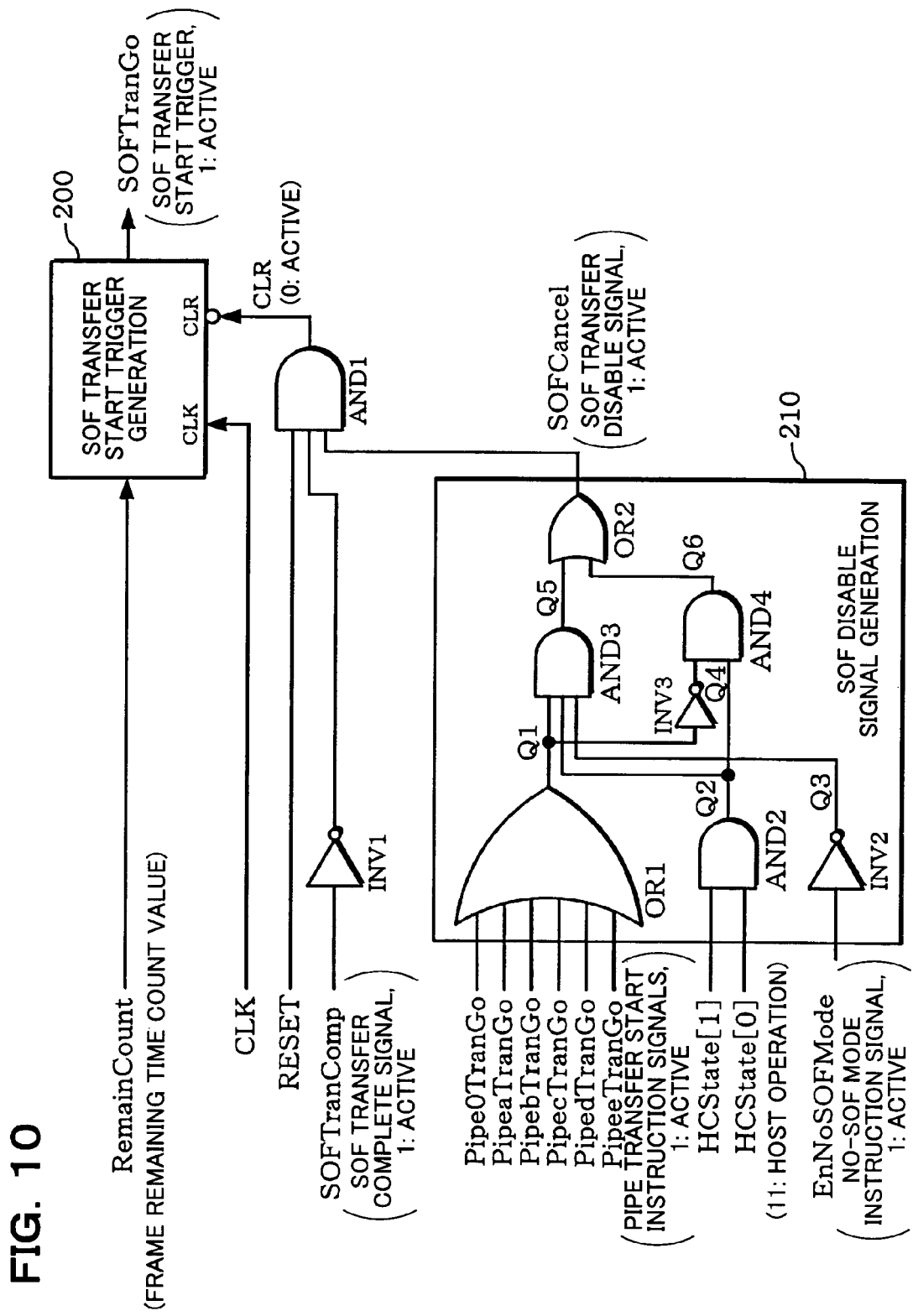
FIG. 10 shows an example of the configuration of a circuit that disables the periodic transfer of SOF packets.

A specific example of a circuit that disables the periodic transfer of SOF packets is shown in FIG. 10. The circuit of FIG. 10 is included within the host controller 50 of FIG. 4.

A SOF transfer start trigger generation circuit 200 makes SOFTranGo (SOF transfer start trigger) go active (logic value 1=high) in each frame and makes SOFTranGo go inactive (logic value 0=low) when the transfer of a SOF packet is completed.

Specifically, the SOF transfer start trigger generation circuit 200 receives RemainCount (frame remaining time count) and CLK (a clock signal) from the OTG controller 20 (state controller) of FIG. 4. It also receives SOFTranComp (SOF transfer complete signal) through an AND circuit AND1. It makes SOFTranGo go active (1) at each frame period, based on RemainCount. When SOFTranComp goes active and CLR (a clear signal) that is output from the AND circuit AND1 goes active (0), it makes SOFTranGo go inactive (0). This makes it possible to generate a pulse-form trigger signal SOFTranGo that goes active at each frame period.

A SOF disable signal generation circuit 210 (non-SOF mode condition determination circuit) receives Pipe0TranGo to PipeeTranGo (transfer start instruction signals for pipe regions PIPE0 to PIPEe), HCState[1] and HCState[0] (state information signals from the OTG controller 20), and EnNoSOFMode (non-SOF mode instruction signal or mode instruction signal for non-SOF bulk transfer only; broadly speaking: a signal indicating first or second mode). It then generates SOFCancel, which is a signal that disables SOFTranGo (a signal that always sets SOFTranGo to be inactive). This SOF disable signal generation circuit 210 includes OR circuits OR1 and OR2, AND circuits AND2, AND3, and AND4, and inverter circuits INV2 and INV3.

In this case, Pipe0TranGo to PipeeTranGo are input to OR1. These PipeXTran (where X=0 to e) are signals that go active (1) when the firmware (processing section) instructs automatic transfer for the corresponding pipe region, as shown at C1 and C12 in FIG. 7, and inactive when automatic transfer for that pipe region by the host controller 50 is completed.

HCState[1] and HCState[0] are input to AND2. These HCState[1] and HCState[0] signals are 00, 01, 10, and 11 when the state of the data transfer control device controlled by the OTG controller 20 of FIG. 4 (the OTG state of the A-device or B-device) is suspend, reset, resume, or host operation, respectively.

EnNoSOFMode is input to INV2. This EnNoSOFMode is a signal that is inactive (0) in with-SOF mode (the first mode), as shown at C13 in FIG. 7, and active (1) in non-SOF mode (the second mode), as shown at D16 in FIG. 8.

Outputs Q1, Q2, and Q3 of OR1, AND2, and INV2 are input to AND3, and Q1 is also input to INV3. An output Q4 of INV3 and the output Q2 of AND2 are input to AND4. Outputs Q5 and Q6 of AND3 and AND4 are input to OR2, which outputs SOFCancel.

A truth table for the SOF disable signal generation circuit 210 is shown in FIG. 11B.

As shown at F1 in FIG. 11B, SOFCancel is 0 when HCState[1]) and HCState[1] are 00, 01, or 10. In other words, SOFCancel is 0 when the state of the data transfer control device (the host controller 50) is suspend, reset, or resume, so that the periodic transfer of SOF packets is disabled by keeping SOFTranGo always at 0.

As shown at F2 in FIG. 11B, SOFCancel is 1 when EnNoSOFMode is 0 because HCState[1] and HCState[0] are 11. In other words, if the state is host operation and with-SOF mode has been set (EnNoSOFMode=0), data transfer is performed while SOF packets are transferred at frame periods, as shown at C2 and C10 in FIG. 7.

As shown at F3 in FIG. 11B, SOFCancel is 0 when HCState[1] and HCState[0] are 11, EnNoSOFMode is 1, and also at least one of Pipe0TranGo to PipeeTranGo is 1. In other words, if the state is host operation, non-SOF mode has been set (EnNoSOFMode=1), and also there is data to be transferred, the periodic transfer of SOF packets is disabled, as shown at D1, D2, and D3 of FIG. 8. Bulk data transactions are executed continuously without breaks over frame boundaries, as shown at D4 to D15 in FIG. 8. In other words, the host controller 50 automatically transfers bulk data (packets) between a pipe region and a bulk (non-periodic) transfer endpoint corresponding to that pipe region, while disabling the periodic transfer of SOF packets.

As shown at F4 in FIG. 11B, SOFCancel is 1 when HCState[1] and HCState[0] are 11, EnNoSOFMode is 1, and also all of Pipe0TranGo to PipeeTranGo are 0. In other words, if the state is host operation and there is no data to be transferred (Pipe0TranGo to PipeeTranGo=0), SOF packets are transferred periodically as shown at E8, E9, and E10 of FIG. 9, even if non-SOF mode has been set (EnNoSOFMode=1). That is to say, the host controller 50 determines that there is no data to be transferred when all of the pipe region automatic transfer start instruction signals Pipe0TranGo to PipeeTranGo are inactive (0). In that case, a SOF packet is transferred automatically in the frame period, even if non-SOF mode has been set. This makes it possible to prevent a state in which the peripheral goes into a suspended state erroneously.

8. Transfer Condition Registers (Common Registers)

Figure 12:
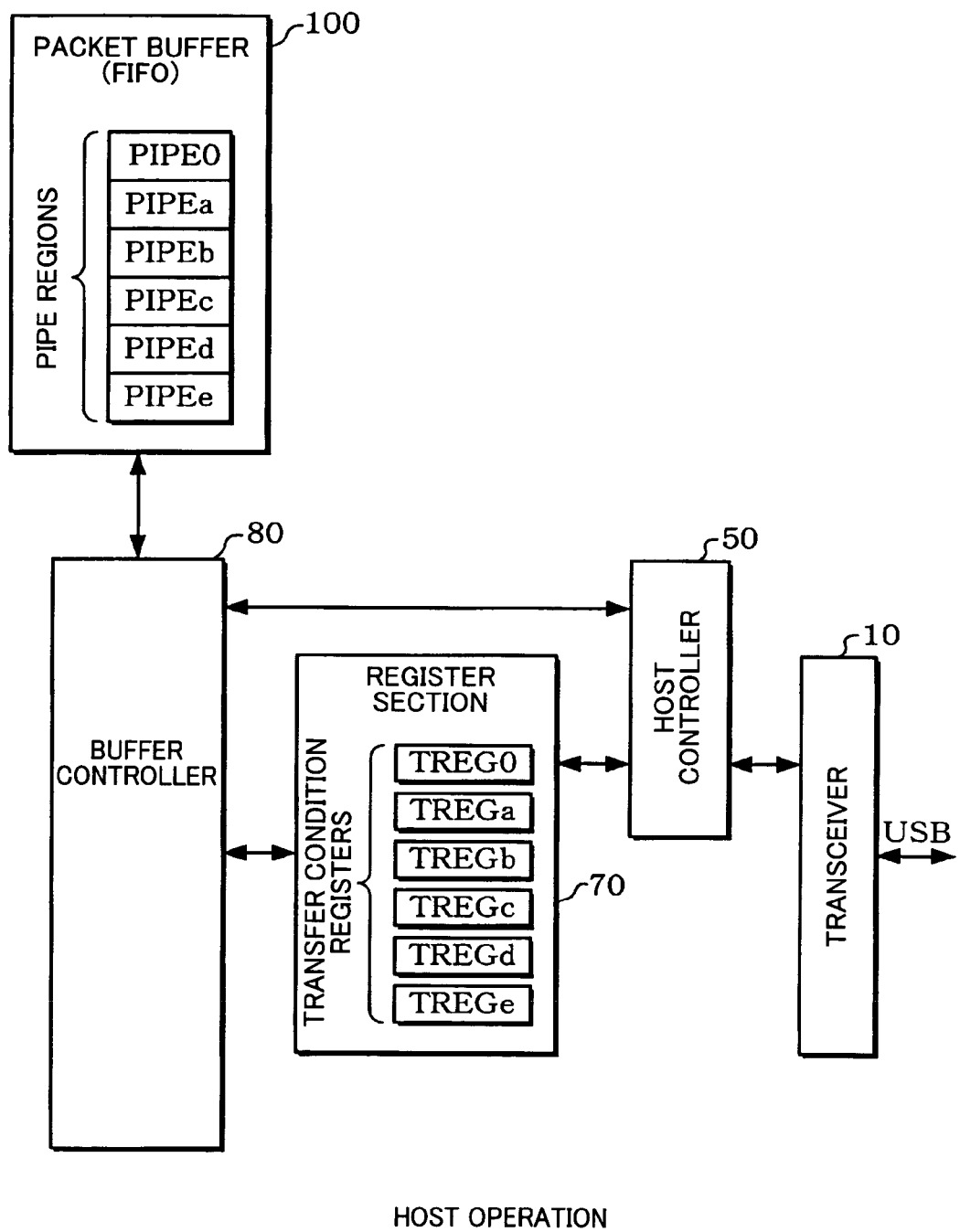
FIG. 12 is illustrative of the operation of the data transfer control device as a host.

When the device of this embodiment is operating as a host, transfer condition information (such as transfer direction, transfer type, maximum packet size, or number of pages) for data transfer to be performed between pipe regions PIPE0 to PIPEe and endpoints is set in transfer condition registers TREG0 to TREGe, as shown in FIG. 12. In other words, transfer condition information for PIPE0, PIPEa, PIPEb, PIPEc, PIPEd, and PIPEe is set (stored) in TREG0, TREGa, TREGb, TREGc, TREGd, and TREGe. This setting could be done by firmware (theCPU), by way of example.

The host controller 50 (broadly speaking: a transfer controller) initiates each transaction with respect to an endpoint, based on the transfer condition information that has been set in the transfer condition registers TREG0 to TREGe. Data (packets) is transferred automatically between each pipe region and the corresponding endpoint.

With the thus-configured embodiment, a transfer condition register is provided for each pipe region (buffer region) and pipe transfer for each pipe region (transfer of a given data unit) is done automatically by the host controller 50, based on the transfer condition information that has been set in these transfer condition registers. The firmware (driver or software) therefore need not be involved in data transfer control after setting the transfer condition information in the transfer condition registers, until data transfer is complete. An interrupt is generated when the pipe transfer of the given data unit is complete, to inform the firmware than the transfer is complete. This enables a large reduction in the processing load on the firmware (CPU).

Figure 13:
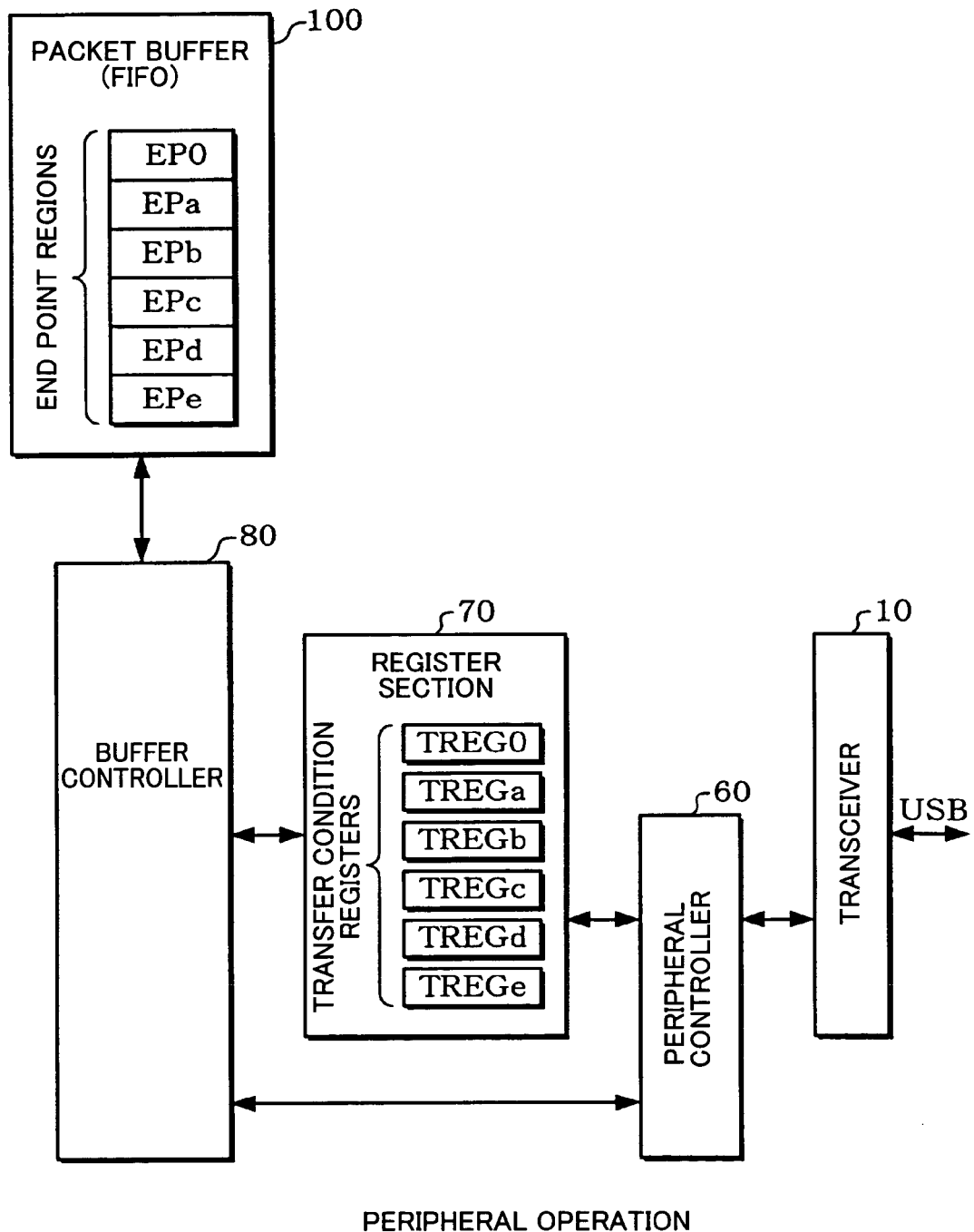
FIG. 13 is illustrative of the operation of the data transfer control device as a peripheral.

Note that when the device of this embodiment is operating as a peripheral, transfer condition information (such as transfer direction, transfer type, maximum packet size, or number of pages) for data transfer to be performed between the endpoint regions EP0 to EPe and the host is set in the transfer condition registers TREG0 to TREGe, as shown in FIG. 13. The peripheral controller 60 (broadly speaking: a transfer controller) performs data transfer between the endpoint region and the host, based on the transfer condition information that has been set in the transfer condition registers TREG0 to TREGe.

With the thus-configured embodiment, the transfer condition registers TREG0 to TREGe are used in common during operation as host and during operation as peripheral. This makes it possible to save on resources for the register section 70, thus making the data transfer control device smaller.

An example of the configuration of the registers of the register section 70 is shown in FIG. 14. Note that some of the registers of the register section 70 could be included within individual blocks (such as OTGC, HC, PC, or Xcvr).

As shown in FIG. 14, the transfer condition registers (TREG0 to TREGe) of the register section 70 include HC/PC common registers (common transfer condition registers) used both during host operation (HC, PIPE) and during peripheral operation (PC, EP). It also includes HC (PIPE) registers (transfer condition registers for the host) that are used only during host operation. It further includes PC (EP) registers (transfer condition registers for the peripheral) that are used only during peripheral operation. In addition, it includes access control registers which are registers for controlling access to the packet buffer (FIFO) and which are used both during host operation and during peripheral operation.

While a dual-role device is operating as a host, for example, the host controller 50 (HC) transfers data (packets), based on transfer condition in formation set in the HC/PC common registers and the PC registers.

During operation as a peripheral, on the other hand, the peripheral controller 60 (PC) transfers data (packets), based on transfer condition information set in the HC/PC common registers and the PC registers.

During both host operation and peripheral operation, the buffer controller 80 performs access control (such as initiation of read/write addresses, data read/write, access arbitration) to the packet buffer 100, based on the common access control registers.

The data transfer direction (such as IN, OUT, or SETUP), the transfer type (transaction type, such as isochronous, bulk, interrupt, or control), endpoint number (the number linked to an endpoint in a USB device), and the maximum packet size (maximum payload size of a packet that an endpoint can transmit or receive, and the page size) are set in the HC/PC common registers of FIG. 14. In addition, the number of pages in the buffer region (pipe region or endpoint region) (number of screens of the buffer region) is set therein. Furthermore, information that instructs the presence or absence of a DMA connection (presence or absence of the use of DMA transfer by the DMA handler circuit 112) is set therein.

The token issue period for interrupt transfer (the period or interval at which interrupt transactions are activated) is set in the HC (PIPE) registers. The number of continuous executions of transactions (information that sets transfer ratios between the pipe regions, the number of continuous executions of transactions for each pipe region) is also set. The function address (USB address of a function having an endpoint) and the total size of the transfer data (total size of data to be transferred through each pipe region, in data units such as IRP) are also set. The automatic transaction start instruction (a start instruction for automatic transaction with respect to the host controller) is also set. The automatic control transfer mode instruction (an instruction for a mode that automatically initiates the control transfer setup stage, data stage, and status stage) is set.

The end point enable (an instruction that enables or disables an endpoint) and a handshake specification (a specification of the handshake to be used for each transaction) are set in the PC (EP) registers.

The buffer and I/O port (the I/O port for PIO transfer by the CPU) is set in the common access control registers for packet buffer (FIFO). A buffer full/empty flag (notification of whether each buffer region is full or empty) and a buffer remaining data size (the remaining data size for each buffer region) are also set.

The register section 70 includes registers such as interrupt-related registers, block-related registers, and a DMA control register.

The interrupt-related registers include an interrupt status register that indicates the interrupt status (cause) to the CPU, and an interrupt enable register that sets enabled/disabled (non-masked, masked) for interrupts. Note that the interrupts include interrupts relating to the OTG controller 20, to the host controller 50, and to the peripheral controller 60.

The block-related registers include an inter-block common register that is used in common between blocks and block registers that are used within the blocks (Xcvr, OTGC, HC, and PC).

The inter-block common register is a register that instructs the reset of each block. The block registers include a register for controlling the transceiver 10 (Xcvr), a state command register for the OTG controller 20 (OTGC), a state command register for the host controller 50 (HC), and a register for setting frame number.

With this embodiment as described above, registers used both during host operation and during peripheral operation (HC/PC common registers and common access control registers) are provided in the register section 70. This enables a reduction in size of the register section 70, in comparison with the case in which completely separate registers are provided for when the device is operating as a host and when it is operating as a peripheral. Access addresses to the common registers, as seen from the firmware (driver) operating on the CPU, can be made the same for host operation and peripheral operation. The firmware can therefore use the same addresses for managing these common registers, enabling a simplification of the firmware processing.

Since HC registers and PC registers are provided, specific transfer conditions can be set for host operation (PIPE) transfer and peripheral operation (EP) transfer. For example, it is possible to issue the interrupt transfer token at any desired timing during host operation, by setting the token issue period. It is also possible to set the transfer ratios between pipe regions as required during host operation, by setting the numbers of continuous executions. Similarly, it is possible to set any data size to be transferred automatically through a pipe region during host operation, by setting the total size therefor. The firmware is configured in such a manner that it can instruct the start of automatic transactions and instruct the turning on and off of automatic control transfer mode, during host operation.

9. Automatic Transactions

Figure 15:
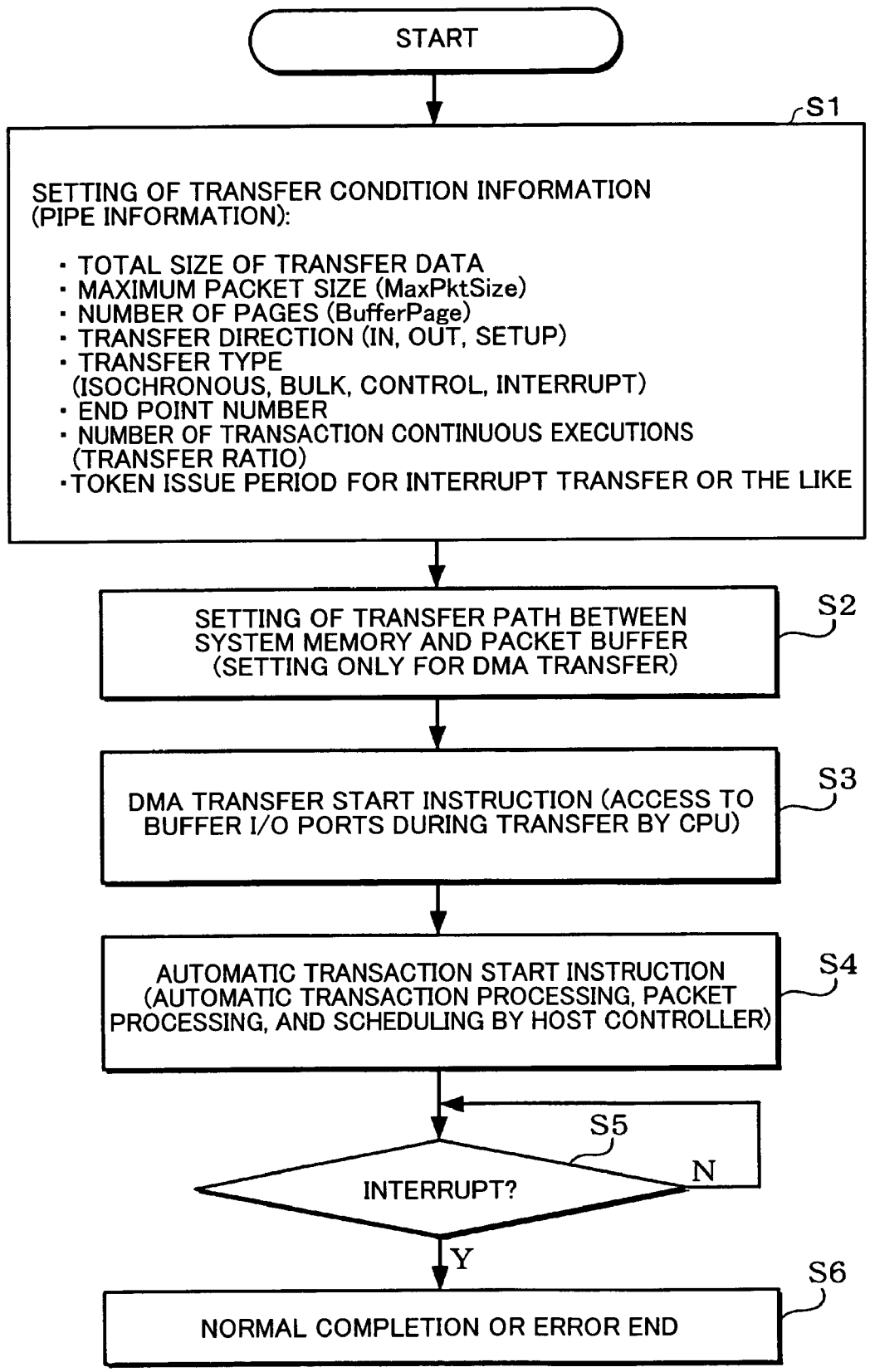
FIG. 15 is a flowchart illustrating a processing example of the firmware.

A typical flowchart of firmware processing during the processing of automatic transaction (IN or OUT) of the host controller 50 is shown in FIG. 15.

First of all, the firmware (processing section or driver) sets the transfer condition information (pipe information) in the transfer condition registers described with reference to FIG. 16 (step S1). More specifically, data such as the total size of the transfer data, the maximum packet size (MaxPktSize), the number of pages (BufferPage), the transfer direction (IN, OUT, or SETUP), the transfer type (isochronous, bulk, control, or interrupt), the endpoint number, the number of continuous transaction executions for the pipe region (transfer ratio), and the token issue period for interrupt transfer are set in the transfer condition registers.

The firmware then sets a transfer path between the external system memory and the packet buffer 100 (step S2). In other words, it sets a DMA transfer path through the DMA handler circuit 112 of FIG. 4.

The firmware then instructs DMA transfer start (step S3). In other words, it makes the DMA transfer start instruction bit of the DMA control register of FIG. 16 go active. Note that transfer by CPU enables access to the packet buffer 100 by access to the buffer I/O ports of FIG. 14.

The firmware then instructs the automatic transaction start (step S4). In other words, it makes the automatic transaction start instruction bit of the HC register (pipe register) of FIG. 14 go active. This causes the host controller 50 to perform automatic transaction processing, packet processing (packet creation/analysis), and scheduling processing. In other words, the host controller 50 automatically transfers data specified by the total size, using packets of a payload of the maximum packet size and in the direction (IN or OUT) specified by the transfer direction.

Note that the processes of steps S3 and S4 can be done in either order, so that the DMA transfer start instruction can come after the automatic transaction start instruction.

The firmware waits until the issue of an interrupt informing of the completion of the pipe transfer (step S5). When the interrupt is issued, the firmware checks the interrupt status (cause) in the interrupt-related register of FIG. 14. The processing is either completed normally or ends in error (step S6).

Simply by setting transfer condition information for each pipe region (step S1) then instructing DMA transfer start (step S3) and automatic transaction start (step S4), the firmware of the thus-configured embodiment can rely on the hardware circuitry of the host controller 50 to perform subsequent data transfer processing automatically. This therefore reduces the processing load on the firmware in comparison with the method that conforms to OHCI, described with reference to FIGS. 3A and 3B, making it possible to provide a data transfer control device that is optimal for a portable device that incorporates a limited-capability CPU.

10. Detailed Configurational Examples of Blocks

The description now turns to details of the configurations of the various blocks.

10.1 OTG Controller

Figure 16:
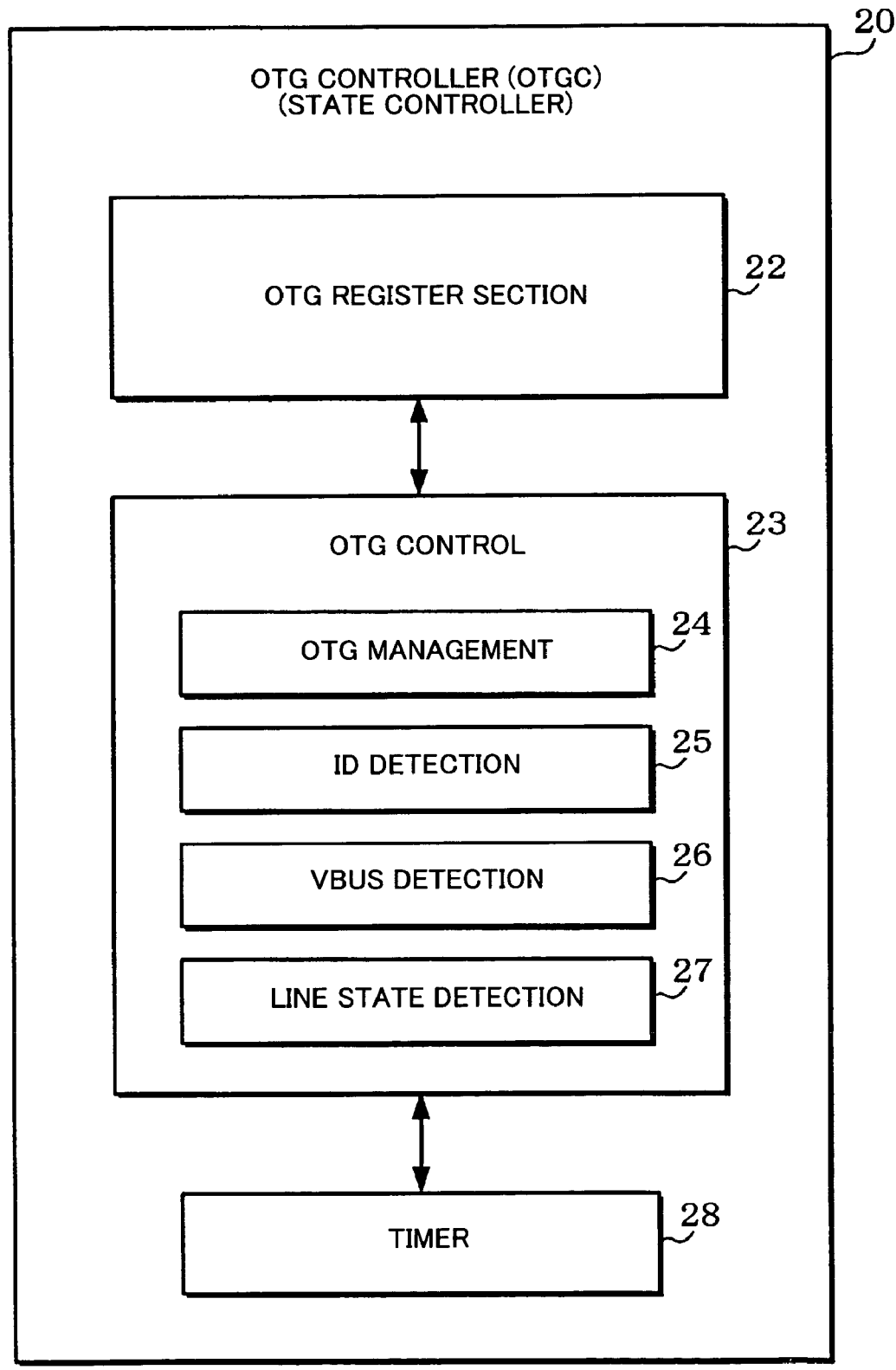
FIG. 16 shows a detailed example of the configuration of the OTG controller.

An example of the configuration of the OTG controller 20 is shown in FIG. 16.

The OTG controller 20 includes an OTG register section 22. This OTG register section 22 includes monitor and control registers for the OTG controller 20. It also includes a circuit that decodes OTG state commands that are written by the firmware (CPU).

The OTG controller 20 also includes an OTG control circuit 23. This OTGcontrol circuit 23 includes an OTG management circuit 24 that manages the OTG state, an ID detection circuit 25 that detects the voltage level of the ID pin, and a VBUS detection circuit 26 that detects the voltage level of VBUS.

The OTG controller 20 also includes a timer 28 that measures time, which is one transition determination condition for the OTG state.

Information to be detected for changing the OTG state is ID, the VBUS voltage level, and the DP/DM line state. The OTG controller 20 of this embodiment detects this information and transfers it to the firmware (CPU) via monitor registers.

The firmware changes its own state, based on the thus-detected information, and uses the OTG state command to inform the OTG controller 20 of the next state to change to.

The OTG controller 20 decodes the OTG state command then performs VBUS drive control and connection control over the pull-up/pull-down resistors, based on the decoded result, to implement the SRP or HNP described with reference to FIGS. 2A and 2B.

With this embodiment as described above, the OTG controller 20 is in charge of OTG control in each state so that the firmware can concentrate on state transition management. As a result, the processing load on the firmware (CPU) can be reduced in comparison with the case in which all state controls implemented by the firmware, and it is also possible to develop efficient firmware.

Note that the determination of OTG state transitions could be done by hardware circuitry, not the firmware. Alternatively, substantially all of the processing of the OTG controller 20 (such as processing other than VBUS control, pull-up/pull-down resistor control, ID detection, VBUS detection, and line state detection) could be implemented by firmware (software).

10.2 Host Controller and Peripheral Controller

Figure 17A:
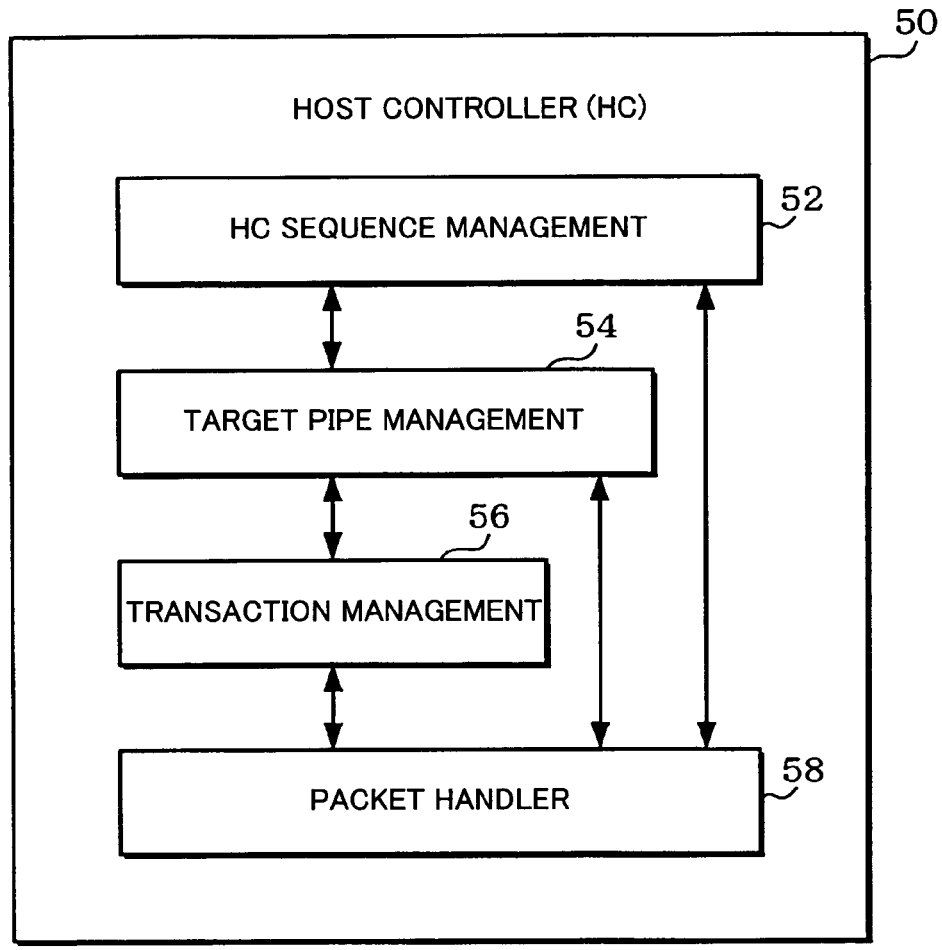
FIGS. 17A and 17B show detailed examples of the configurations of the host controller and the peripheral controller.

An example of the configuration of the host controller 50 is shown in FIG. 17A.

The host controller 50 includes an HC sequence management circuit 52. This HC sequence management circuit 52 performs functions such as arbitration of pipe transfer (data transfer using the pipe region), time management, scheduling of pipe transfer, and re-transmission management.

More specifically, the HC sequence management circuit 52 instructs the transmission of the frame number count and a start-of-frame (SOF) packet. It performs processing to ensure that isochronous transfer is executed preferentially at the start, and processing to ensure that interrupt transfers are handled preferentially after isochronous transfers. It also processes each pipe transfer instruction in accordance with the pipe transfer sequence. Furthermore, it manages the number of continuous executions of transactions and confirms the remaining frame time. In addition, it performs processing to cope with handshake packets (ACK or NAK) returning from the peripheral. It also performs error processing during transaction execution.

The host controller 50 includes a target pipe management circuit 54. This target pipe management circuit 54 performs processing such as the handling of transfer condition information that has been set in the transfer condition registers of the register section 70.

More specifically, the target pipe management circuit 54 selects transfer condition information and creates interrupt signals. After automatic transaction start has been instructed, it loads the total size of transfer data for that pipe region. It then performs count processing (decrementation) of the remaining transfer data size. It also confirms the state of the buffer (FIFO) region during the transmission/reception of data to the buffer controller 80. It also instructs a transaction management circuit 56 to perform transfers. Furthermore, it determines the reception of an unexpected short packet or the reception of a packet of larger than the maximum packet size. If a mode in which a zero-length packet is transferred automatically has been set, it instructs the transaction management circuit 56 to transmit the final zero-length packet. It also manages the sequencing for automatic control transfer mode.

The host controller 50 includes the transaction management circuit 56. This transaction management circuit 56 classifies transfer packets and manages the transfer sequence (transaction sequence management). It also monitors for time-out. Furthermore, it performs transaction end notification processing.

The host controller 50 includes a packet handler circuit 58. This packet handler circuit 58 creates or analyzes packets. It also performs PID checks and decodes/encodes CRC bits. It reads or writes the payloads of packets in the buffer region, and transmits SOF packets. It also counts the transmission/reception data.

Figure 17B:
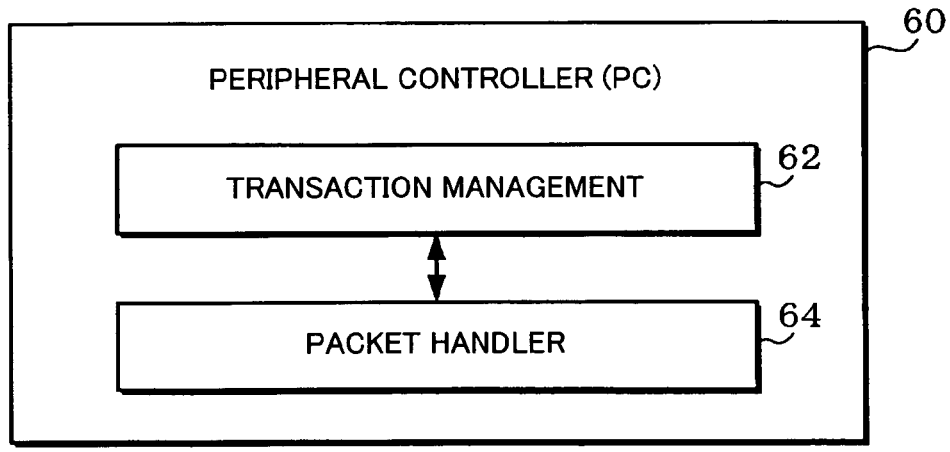

An example of the configuration of the peripheral controller 60 is shown in FIG. 17B.

The peripheral controller 60 includes a transaction management circuit 62 and a packet handler circuit 64. The transaction management circuit 62 and the packet handler circuit 64 perform substantially the same processing as the transaction management circuit 56 and the packet handler circuit 58 of the host controller 50.

10.3 Buffer Controller

Figure 18:
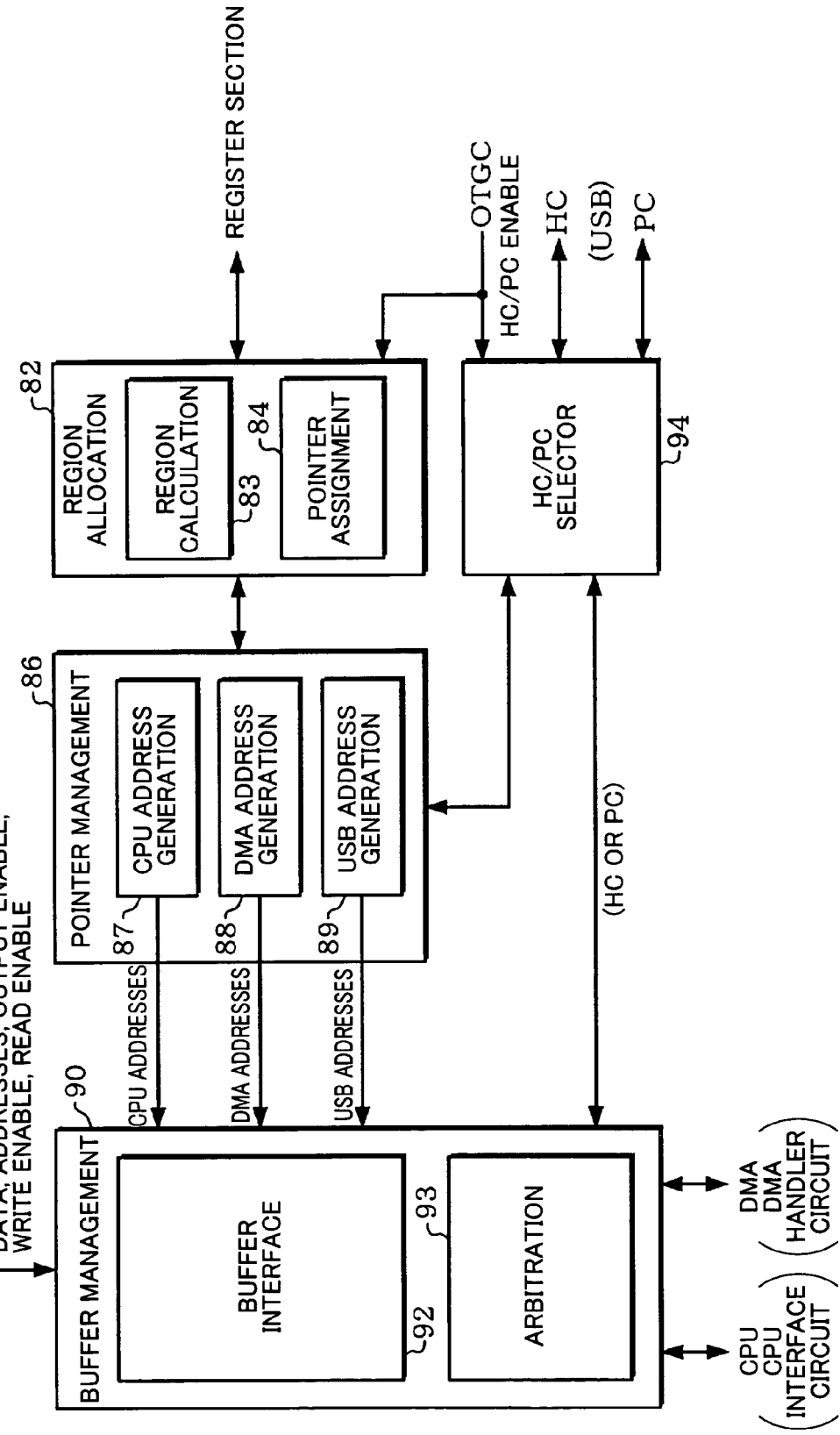

An example of the configuration of the buffer controller 80 is shown in FIG. 18.

The buffer controller 80 includes a region allocation circuit 82. This region allocation circuit 82 is a circuit that allocates the buffer region in the packet buffer 100 (a region in which pipe regions are set during host operation or endpoint regions are set during peripheral operation).

The region allocation circuit 82 includes a region calculation circuit 83. This region calculation circuit 83 is a circuit that calculates the region size, start address, and end address of the buffer region, based on the maximum packet size (broadly speaking: the page size) and the number of pages.

Figures 19A, 19B, 19C:
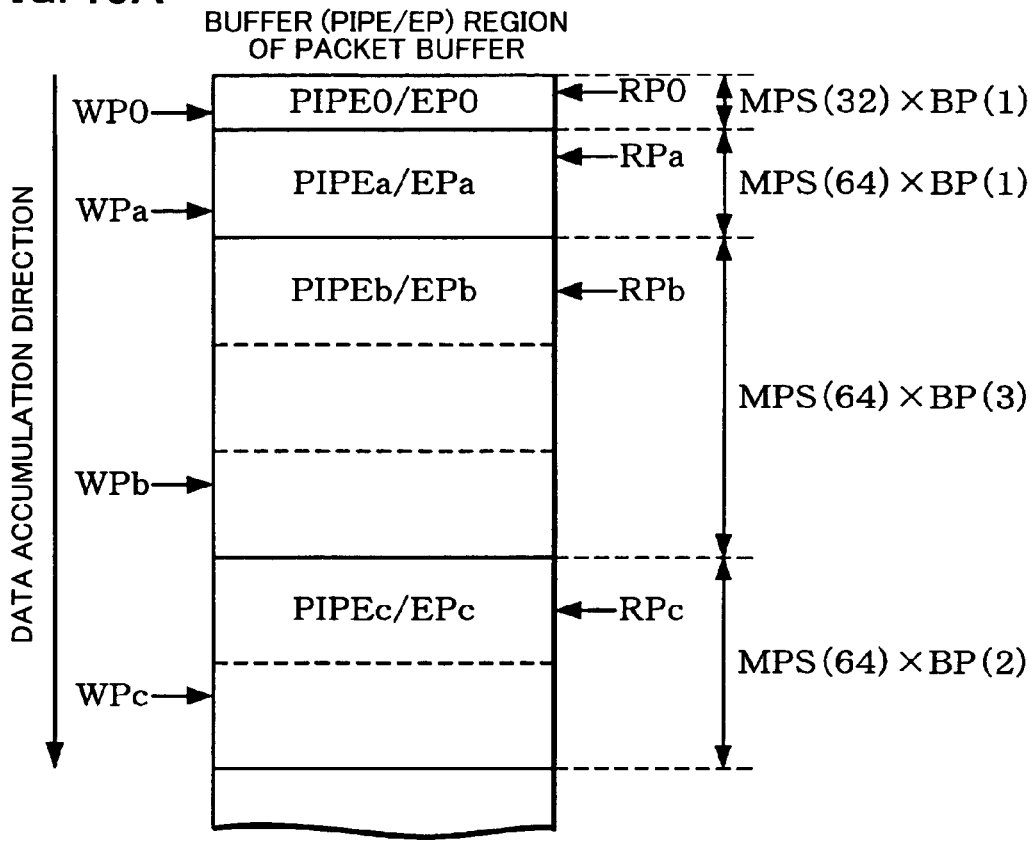
FIG. 19A, FIG. 19B, FIG. 19C are illustrative of the region allocation method and the pointer assignment method.

Assume, by way of example, that a maximum packet size (MaxPktSize) of 32, 64, 64, and 64 bytes is set for each of the buffer regions PIPE0/EP0, PIPEa/EPa, PIPEb/EPb, and PIPEc/EPc shown in FIG. 19A and the number of pages (BufferPage) is set to 1, 1, 3, and 2 pages, respectively. The region calculation circuit 83 calculates the region sizes, start addresses, and end addresses of these buffer regions PIPE0/EP0 to PIPEc/EPc, based on data such as these maximum packet sizes and numbers of pages. In the example shown in FIG. 20A, the region sizes of PIPE0/EP0, PIPEa/EPa, PIPEb/

EPb, and PIPEc/EPc are calculated to be 32 (=32×1), 64 (=64×1), 192 (=64×3), and 128 (=64×2) bytes, respectively.

A pointer assignment circuit 84 is a circuit that assigns write pointers WP (WP0, WPa, WPb, WPc) and read pointers RP (RP0, RPa, RPb, RPc) for each buffer region, to DMA pointers, CPU pointers, and USB pointers.

For data transmission (transfer of data from the DMA or CPU to the USB side through the packet buffer 100) when DMA transfer is used, as shown in FIG. 19B by way of example, the write pointer WP of that buffer region is assigned to the pointer for DMA (DMA access) and the read pointer RP is assigns to the pointer for USB (USB access). For data transmission when CPU (PIO) transfer is used, the write pointer WP of that buffer region is assigned to the pointer for CPU (CPU access) and the read pointer RP is assigned to the pointer for USB.

For data reception (transfer of data from USB to the DMA or CPU through the packet buffer 100) when DMA transfer is used, as shown in FIG. 19C, the write pointer WP of that buffer region is assigned to the USB pointer and the read pointer RP is assign to the DMA pointer. Similarly, for data reception when CPU transfer is used, the write pointer WP of that buffer region is assigned to the USB pointer and the read pointer RP is assigned to the CPU pointer.

Note that the pointer information (position information) for the write pointer WP and read pointer RP of each buffer region is stored in the transfer condition registers (PIPE/EP registers) of the register section 70.

A pointer management circuit 86 is a circuit for creating actual addresses for access to the packet buffer 100, while updating the pointers.

The pointer management circuit 86 includes a CPU address generation circuit 87, a DMA address generation circuit 88, and a USB address generation circuit 89. These address generation circuits 87, 88, and 89 generate CPU addresses, DMA addresses, and USB addresses, based on the CPU pointer, DMA pointer, and USB pointer assigned by the pointer assignment circuit B4. They also update the pointers at each access from the CPU (CPU interface circuit) or DMA (DMA handler circuit) and at each transaction end (handshake transmission/reception such as ACK or NAK). Note that post-update pointer information is overwritten into the transfer condition registers of the register section 70 through the region allocation circuit 82.

A buffer management circuit 90 is a circuit that manages accesses to the packet buffer 100.

The buffer management circuit 90 includes a buffer interface circuit 92. This buffer interface circuit 92 receives data such as CPU addresses, DMA addresses, and USB addresses from the pointer management circuit 86, performs input-output to the packet buffer 100, and outputs data such as addresses, output enable, write enable, and read enable.

The buffer management circuit 90 also includes an arbitration circuit 93. This arbitration circuit 93 is a circuit that arbitrates accesses from the CPU (CPU interface circuit), DMA (DMA handler circuit), and USB (host controller or peripheral controller). ACPU address, DMA address, or USB address is output as an access address for the packet buffer 100, based on this arbitration result, to set a data transfer path between the CPU, DMA, or USB and the packet buffer 100.

An HC/PC selector 94 performs switching control of the connection between the buffer management circuit 90 (the buffer controller 80) and either the host controller 50 (HC) or the peripheral controller 60 (PC). During host operation, it connects the host controller 50 and the buffer management circuit 90, and during peripheral operation, it connects the peripheral controller 60 and the buffer management circuit 90. Note that this connection switching control is based on an HC/PC enable signal from the OTG controller (OTCG) 20.

11. Electronic Equipment

The description now turns to examples of electronic equipment including the data transfer control device of this embodiment of the invention.

Figure 20A:
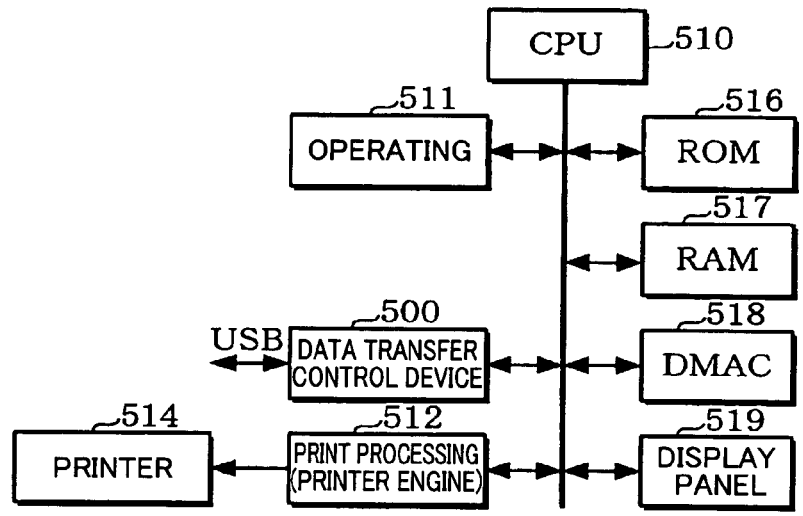
FIGS. 20A, 20B, and 20C are internal block diagrams of various items of electronic equipment.
Figure 21A:
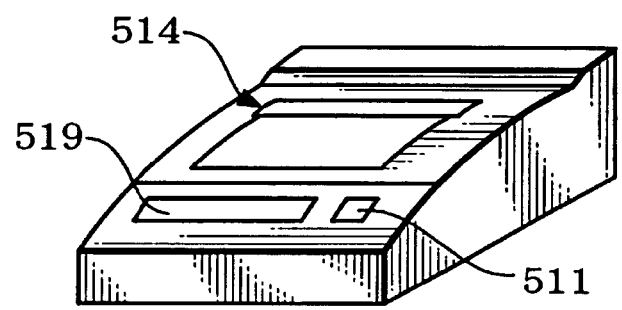
FIG. 21A, FIG. 21B, FIG. 21C are external views of various items of electronic equipment.

An internal block diagram of a printer that is one example of such electronic equipment is shown in FIG. 20A with an external view thereof being shown in FIG. 21A. A CPU 510 (processing section) has various functions, including that of controlling the entire system. An operating section 511 is designed to enable the user to operate the printer. Data such as a control program and fonts is stored in a ROM 516, and a RAM 517 (system memory) functions as a work area for the CPU 510. A DMAC 518 is a DMA controller for transferring data through the CPU 510. A display panel 519 is designed to inform the user of the operational state of the printer.

Serial print data that has been sent in from another device such as a personal computer, digital camera, or digital video camera via USB is converted into parallel print data by a data transfer control device 500. The thus converted parallel print data is sent to a print processing section (a printer engine) 512 by the CPU 510 or the DMAC 518. This parallel print data is subjected to given processing in the print processing section 512 and is output for printing to paper by a printer section (a device for outputting data) 514 including components such as a print head.

Figure 20B:
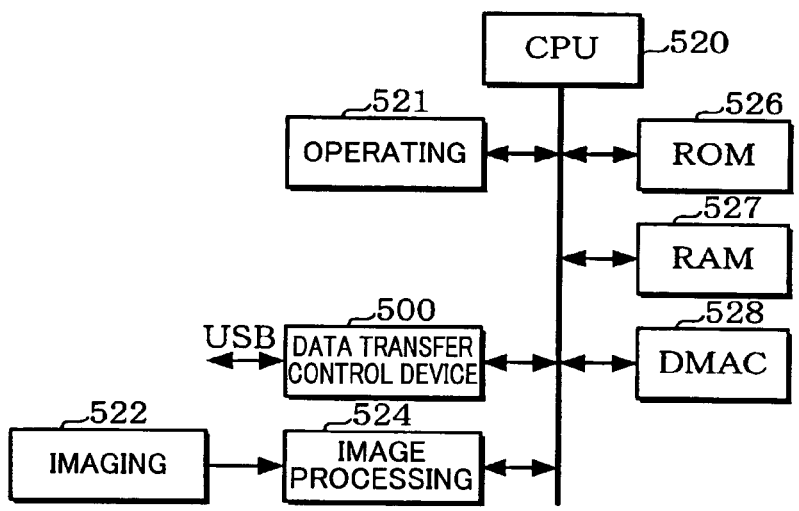
Figure 21B:
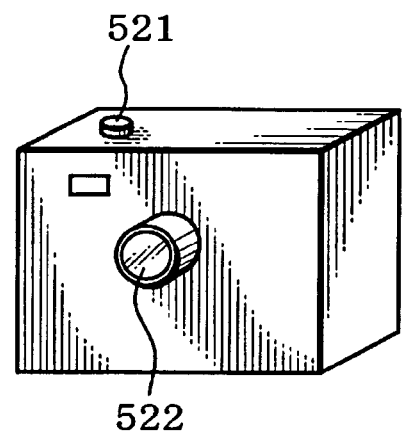

An internal block diagram of a digital camera that is another example of electronic equipment is shown in FIG. 20B with an external view thereof being shown in FIG. 21B. A CPU 520 has various functions, including that of controlling the entire system. An operating section 521 (including controls such as a shutter button and operating buttons) is designed to enable the user to operate the digital camera. Data such as a control program is stored in a ROM 526, and a RAM 527 functions as a work area for the CPU 520. A DMAC 528 is a DMA controller.

An image of a document is captured by an image capture section (a device for fetching data) 522, which includes components such as a CCD and lens, and data of the captured image is processed by an image processing section 524. The processed image data is sent to the data transfer control device 500 by the CPU 520 or DMAC 528. The data transfer control device 500 converts that parallel image data into serial data and sends it to another device such as a printer, storage device, or personal computer via USB.

Figure 20C:
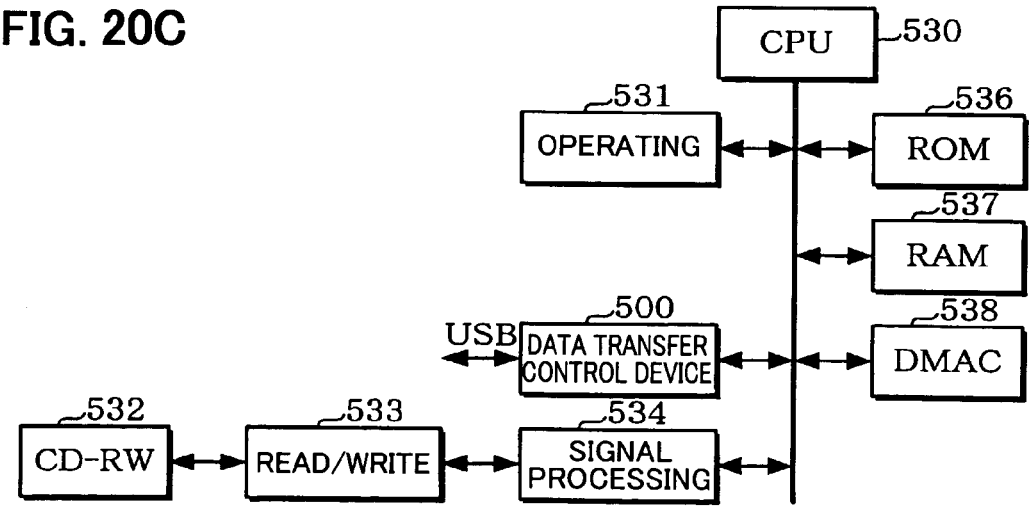
Figure 21C:
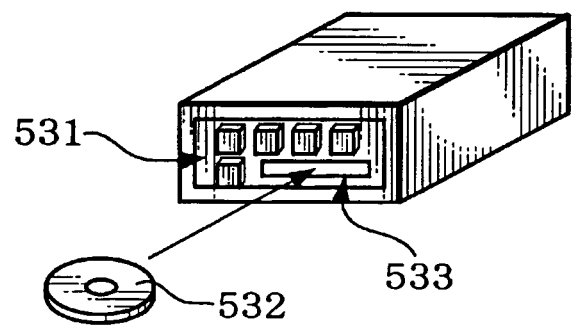

An internal block diagram of a CD-RW drive that is a further example of electronic equipment is shown in FIG. 20C with an external view thereof being shown in FIG. 21C. A CPU 530 has various functions, including that of controlling the entire system. An operating section 531 is designed to enable the user to operate the CD-RW drive. Data such as a control program is stored in a ROM 536, and a RAM 537 functions as a work area for the CPU 530. A DMAC 538 is a DMA controller.

Data read out from a CD-RW 532 by a read/write section (a device for fetching data or a device for storing data) 533, which includes components such as a laser, a motor, and an optical system, is input to a signal processing section 534 where it is subjected to given signal processing such as error correction. The data that has been subjected to this signal processing is sent to the data transfer control device 500 by the CPU 530 or the DMAC 538. The data transfer control device 500 converts this parallel data into serial data, then sends it to another device via USB.

Serial data that comes in from another device via USB, on the other hand, is converted into parallel data by the data transfer control device 500. This parallel data is sent to the signal processing section 534 by the CPU 530 or the DMAC 538. This parallel print data is subjected to given signal processing by the signal processing section 534 then is stored by the read/write section 533 on the CD-RW 532.

Note that a separate CPU for controlling data transfer by the data transfer control device 500 could be provided in addition to the CPU 510, 520, or 530 of FIGS. 20A, 20B, and 20C.

Use of the data transfer control device of this embodiment of the present invention in electronic equipment makes it possible to implement electronic equipment having the OTG function. In other words, electronic equipment can be made to have the role of host and also the role of a device, enabling the development of applications that have not existed up until now.

Use of the data transfer control device of this embodiment in electronic equipment makes it possible to reduce the processing load on the CPU (processing section) incorporated in the electronic equipment, thus making it possible to use an inexpensive CPU. The CPU can also be made to have some spare time for processing other than data transfer control processing, enabling an increase in the capabilities of the electronic equipment and a reduction in the cost thereof. This also makes it possible to simplify firmware programs operating on the CPU, thus shortening the development period of electronic equipment.

Note that electronic equipment that can employ the data transfer control device in accordance with this embodiment includes other types of electronic equipment such as various types of optical disk drive (CD-ROM or DVD), magneto-optic disk drives (MO), hard disk drives, digital video cameras, mobile phones, scanners, TVs, VCRs, audio equipment, telephones, projectors, personal computers, electronic note books, and dedicated word processors.

Note also that the present invention is not limited to the embodiments described herein, and various modifications are possible within the scope of the invention laid out herein.

For example, the configuration of the data transfer control device in accordance with the present invention is preferably that as shown in FIG. 4, but it is not limited thereto.

The configurations of the various blocks of the data transfer control device (such as the HC, PC, and OTGC blocks) are also not limited to those described with reference to this embodiment, and thus various modifications are possible.

The circuit that disables the periodic transfer of SOF packets is also not limited to the configuration shown in FIG. 10, and thus various modifications are possible.

The SOF packets of the present invention could also be packets that have the same function as SOF packets (packets that instruct and manage frame start), irrespective of name.

Terminology (such as: bulk transfer, isochronous transfer, with-SOF mode, non-SOF mode, OTG controller, CPU/firmware, host controller or peripheral controller, USB, pipe region or endpoint region) that is derived from generic terminology defined within this document (such as: non-periodic transfer, periodic transfer, first mode, second mode, state controller, processing section, transfer controller, bus, buffer region) could be replaced by other terminology used within this document.

It is possible for an aspect of the present invention that is defined by a dependent claim to omit some of the configurational requirements of the corresponding antecedent claim. Similarly, the components of the present invention defined by one independent claim can also be allocated to other independent claims.

This embodiment has been described with reference to the application thereof to the USB OTG standard, but the applications of the present invention are not limited to the OTG standard. In other words, the present invention can be applied to data transfer not only of the USB OTG standard, but also to the prior-art USB 1.1 and USB 2.0, as well as standards developed therefrom.

What is claimed is:

1. A data transfer control device for data transfer over a bus, the data transfer control device comprising:
  a buffer controller which performs access control of a packet buffer storing transfer data; and
  a transfer controller which controls a transfer of packet buffer data,
  a first mode, wherein when set the transfer controller performs data transfer while transferring a start-of-frame (SOF) packet at a frame period,
  a second mode, wherein when set the transfer controller, when a transfer type is non-periodic and non-periodic data to be transferred exists, disables transfers of a SOF packet at the frame start timing and performs a transfer of the non-periodic data; and when the transfer type is non-periodic and non-periodic data to be transferred does not exist, performs a transfer of only the SOF packet without performing non-periodic transfer transactions.

2. The data transfer control device as defined by claim 1, the data transfer control device further comprising:
  a state controller which controls a plurality of states including a state of a host operation, in which the data transfer control device operates as a role of a host, and a state of a peripheral operation, in which the data transfer control device operates as a role of a peripheral,
  wherein a plurality of pipe regions are allocated in the packet buffer, each of the pipe regions storing data transferred to or from corresponding one of endpoints,
  wherein the transfer controller includes:
    a host controller which performs data transfer as a host during the host operation; and
    a peripheral controller which performs data transfer as a peripheral during the peripheral operation, and
    wherein the host controller automatically issues a transaction with respect to one of the endpoints and automatically transfers data between each of the pipe regions and corresponding one of the endpoints.

3. The data transfer control device as defined by claim 2, wherein the host controller automatically transfers non-periodic data between one of the pipe regions and an endpoint for non-periodic transfer corresponding to the one pipe region among the endpoints, while disabling all transfers of a SOF packet, when the second mode has been set.

4. The data transfer control device as defined by claim 2, wherein when the first mode has been set, the host controller automatically transfers a SOF packet at a frame period when all of automatic transfer instruction signals of the pipe regions are inactive.

5. The data transfer control device as defined by claim 2, wherein the host controller comprises:
  a SOF transfer start trigger generation circuit which makes a SOF transfer start trigger go active at each frame period, and makes the SOF transfer start trigger go inactive when a transfer of the SOF packet completes; and a SOF disable signal generation circuit which receives an automatic transfer instruction signal of each of the pipe regions, a state information signal from a state controller, and a signal indicating first or second mode, and generates a signal that disables the SOF transfer start trigger.

6. The data transfer control device as defined by claim 2, wherein during peripheral operation, a plurality of endpoint regions are allocated to the packet buffer, each of the endpoint regions storing data transferred to or from the host, and the peripheral controller transfers data between the endpoint regions and the host.

7. The data transfer control device as defined by claim 2, wherein the bus is a universal serial bus (USB), the non-periodic transfer is bulk transfer or control transfer and the non-periodic data is bulk data or control data.

8. The data transfer control device as defined by claim 2, wherein the bus is the universal serial bus (USB) on-the-go (OTG) standard.

9. Electronic equipment comprising:
the data transfer control device defined by claim 2;
a device which performs output processing, fetch processing, or storage processing on data to be transferred through the data transfer control device and bus; and
a processing section which controls data transfer of the data transfer control device.

10. The data transfer control device as defined by claim 2, wherein the host controller automatically transfers non-periodic data between one of the pipe regions and an endpoint for non-periodic transfer corresponding to the one pipe region among the end points, while disabling transfers of a SOF packet when the second mode has been set.

11. The data transfer control device as defined by claim 1, wherein the bus is a universal serial bus (USB), the non-periodic transfer is bulk transfer or control transfer and the non-periodic data is bulk data or control data.

12. The data transfer control device as defined by claim 1, wherein the bus is the universal serial bus (USB) on-the-go (OTG) standard.

13. Electronic equipment comprising:
the data transfer control device defined by claim 1;
a device which performs output processing, fetch processing, or storage processing on data to be transferred through the data transfer control device and bus; and
a processing section which controls data transfer of the data transfer control device.

14. Electronic equipment comprising:
the data transfer control device defined by claim 1;
a device which performs output processing, fetch processing, or storage processing on data to be transferred through the data transfer control device and bus; and
a processing section which controls data transfer of the data transfer control device.

15. The data transfer control device as defined by claim 1, wherein the first mode is a SOF mode and the second mode is a non-SOF mode.

16. A data transfer control method for data transfer through a bus, the method comprising:
performing access control of a packet buffer which stores transfer data;
controlling a transfer of packet buffer data;
setting a first mode to perform performing data transfer while transferring a start-of-frame (SOF) packet at a frame period; and
setting a second mode, when a transfer type is non-periodic transfer and non-periodic data to be transferred exists, to disable transfers of a SOF packet at the frame start timing and to perform a transfer of non-periodic data; and when the transfer type is non-periodic transfer and non-periodic data to be transferred does not exist, to perform a transfer of the SOF packet periodically without performing non-periodic data transfer transactions.

17. The data transfer control method defined by claim 16, the method further comprising:
controlling a plurality of states including a state of a host operation, in which a data transfer control device operates as a role of a host, and a state of a peripheral operation, in which the data transfer control device operates as a role of a peripheral;
performing data transfer as a host during the host operation;
performing data transfer as a peripheral during the peripheral operation; allocating a plurality of pipe regions in the packet buffer during the host operation, each of the pipe regions storing data transferred to or from corresponding one of endpoints; and
automatically issuing a transaction with respect to one of the endpoints and automatically transferring data between each of the pipe regions and corresponding one of the endpoints.

* * * * *